United States Patent
Coulson

(10) Patent No.: US 12,363,094 B2
(45) Date of Patent: Jul. 15, 2025

(54) SECURE DIGITAL ART AND OWNERSHIP RECORDS

(71) Applicant: Always Art LLC, San Francisco, CA (US)

(72) Inventor: Patrick Coulson, San Francisco, CA (US)

(73) Assignee: Always Art LLC, San Francisco, CA (US)

( * ) Notice: Subject to any disclaimer, the term of this patent is extended or adjusted under 35 U.S.C. 154(b) by 259 days.

(21) Appl. No.: 17/964,522

(22) Filed: Oct. 12, 2022

(65) Prior Publication Data

US 2024/0129286 A1   Apr. 18, 2024

Related U.S. Application Data

(60) Provisional application No. 63/255,137, filed on Oct. 13, 2021.

(51) Int. Cl.
| | |
|---|---|
| *H04L 9/40* | (2022.01) |
| *G06F 21/62* | (2013.01) |
| *G06Q 20/38* | (2012.01) |

(52) U.S. Cl.
CPC ...... *H04L 63/0823* (2013.01); *G06F 21/6209* (2013.01); *G06Q 20/389* (2013.01); *G06Q 2220/00* (2013.01); *H04L 2463/101* (2013.01)

(58) Field of Classification Search
CPC ........... H04L 63/0823; H04L 2463/101; G06F 21/6209; G06F 21/6218; G06F 21/6227
See application file for complete search history.

(56) References Cited

U.S. PATENT DOCUMENTS

| | | | |
|---|---|---|---|
| 11,075,766 B1* | 7/2021 | Norton | H04L 9/0819 |
| 2020/0274863 A1* | 8/2020 | Way | H04L 63/08 |
| 2024/0420141 A1* | 12/2024 | Hecht | G06Q 20/4014 |

FOREIGN PATENT DOCUMENTS

| CN | 111639924 A | * | 9/2020 | ......... | G06F 16/2365 |

OTHER PUBLICATIONS

International Search Report and Written Opinion from corresponding International Patent Application No. PCT/US2022/46433, dated Feb. 8, 2023.

(Continued)

*Primary Examiner* — Linglan Edwards
*Assistant Examiner* — Jacob Benedict Knackstedt
(74) *Attorney, Agent, or Firm* — Dergosits & Noah LLP; Todd A. Noah

(57) ABSTRACT

Systems and methods for maintaining and transferring access privileges associated with an artwork are described herein. A server may receive a request to transfer ownership privileges from a named user, the current owner of the artwork, to a second user. The request may include an identification of a universal art record, from a plurality of universal art records in a database, associated with the artwork. When both the named user and the second user use two-factor authentication to confirm the transaction, ownership privileges are transferred to the second user. This may include, for example, modifying the universal art record to indicate in the ownership field that the second user is now the current owner of the artwork, thereby providing the second user with the ability to access a virtual certificate of authenticity and grant possession access to the universal art record to other users.

19 Claims, 15 Drawing Sheets

(56) References Cited

OTHER PUBLICATIONS

International Preliminary Report on Patentability from corresponding International Patent Application No. PCT/US2022/046433, dated Apr. 16, 2024.
Extended European Search Report from corresponding European Patent Application No. 22881719.3 dated Jan. 7, 2025.

\* cited by examiner

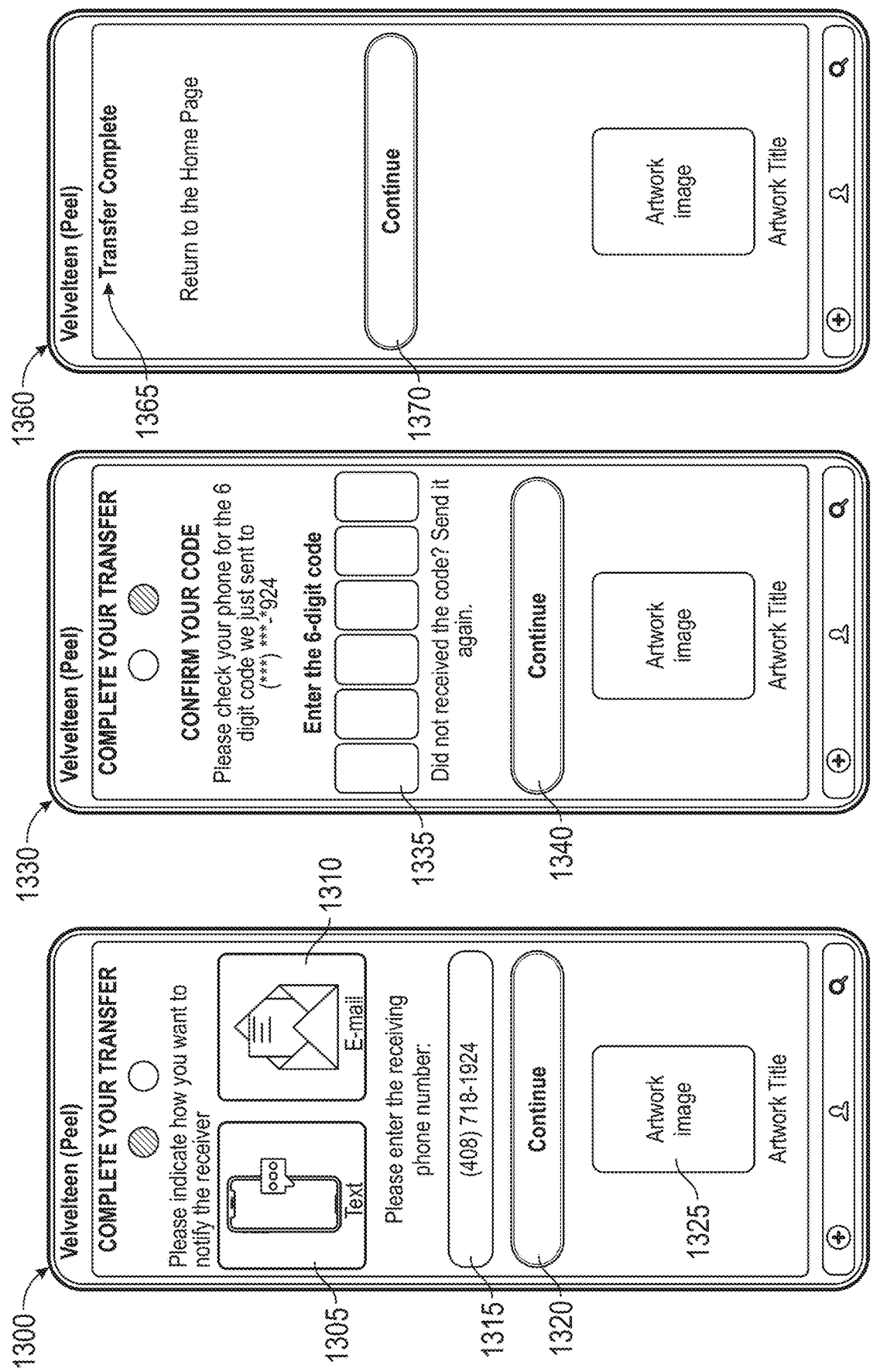

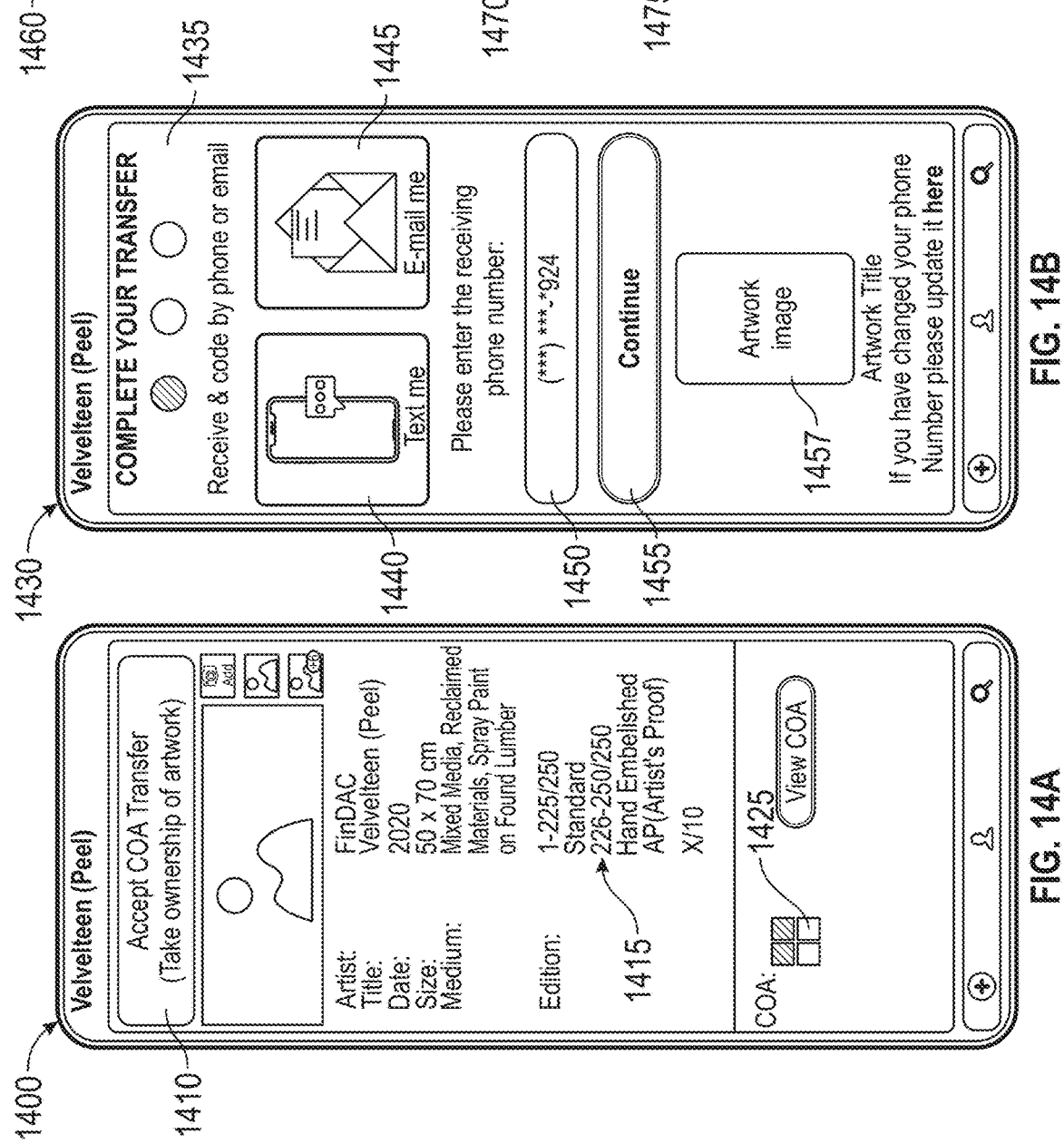

SECURE DIGITAL ART AND OWNERSHIP RECORDS

CROSS-REFERENCE TO RELATED APPLICATIONS

This application claims priority to U.S. Provisional Patent Application No. 63/255,137, filed on Oct. 13, 2021 and entitled "Universal Art Record," which is incorporated herein in its entirety.

FIELD OF THE INVENTION

The present invention relates to the field of cloud-based computing systems, including, more particularly, to systems and techniques for creating and managing digital records for artwork in a secure manner.

BACKGROUND

The art world has gone through a major transformation over the last twenty years due to the impacts of modern computing technology. During this transition a major imbalance has occurred in the relationships between galleries, artists, and collectors. A first problem is a by-product of the Internet and growth of social media. Galleries over the last couple of decades have been offing increasingly diminishing value to artists. This is a direct result of the connectedness the Internet era has provided and the growth of social media and image sharing services like Instagram. Specifically, before the age of the Internet and social media galleries and their representatives would travel the world looking for artists. They would "discover" an artist, sign them, bring them to their cities, host a gallery show, and introduce the artist to a group of collectors who would otherwise never be introduced to the artist. For this discovery, promotion, and exposure galleries would typically receive 50% commission on the sale of an artwork. Today, this may be true for a few shows a gallery does a year but in far more shows galleries do not do the discovery, they do less promotion than the artists themselves, and they rarely introduce collectors to new artists that they would not find on their own. In fact, in many cases artists "followings" on social media are orders of magnitude larger than those of the galleries "promoting" them and the collectors learn of the show from the artist themselves who they are following. Today, the artists responsible for most of the discovery, promotion, and exposure. Even galleries "discover" artists via social media and a gallery is offering a small component of what was offered in the past. However even with this decreased value proposition and workload galleries still require the same 50% commission of sale.

Artists have also been impacted by the growth of the Internet and social media. A presence on both is a necessity for success. To maintain their presence online artists are either spending less time producing art while they manage their social media profiles and communicating with fans/collectors, or they must hire people to help them manage this new workload. This results in the artists earning less revenue as they are giving up the same percentage to galleries and are paying employees to manage the online presence or they are producing less art.

A second problem is galleries are misunderstood and stereotyped as pretentious, elitist, boring, unapproachable, glamorous, and often thought be very successful. The truth is very different, most (upwards of 90%) are small businesses with 3-5 employees and struggling to get by. Many galleries being small businesses do not have sophisticated systems to manage their business and often resort to man hours and labor over automation. There are very few tools build specifically for galleries and most are point solutions that help the galleries with back catalog inventory management, sales pipeline, and collector management.

A third problem is the art world is seen as a form of alchemy, where an artist can take a blank canvas, a board, a piece of stone, and found materials and use them to create something of immense value. Because of this belief many different parties are trying to get a piece of the artists and galleries revenues. Each piece taken is seemingly small but when added up amounts to increased expenses and often increased complexity. For example, galleries are sold email marketing solutions, Certificate of Authenticity solutions, Artwork Marketplace solutions, gifts for charity auctions, etc. Each of these asks is another point solution, another data entry point and another opportunity for the artwork data and pricing information to get out of synch and when sold it all needs to be updated across all platforms. This is an inefficient task and is more complicated when a gallery must train a constantly rotating staff as turnover is high. Artists are presented with an equal amount of point solutions whether they are email marketing, photo management, artwork management, audience generation, etc. The landscape is getting increasingly complex and expensive to maintain.

A fourth problem has to do with Certificates of Authenticity (COAs). A COA is an accompanying document to help certify and artwork is a legitimate work of art by an artist. This helps when insuring or selling an artwork. It also helps with provenance. There is no standard for COAs, they are typically issued by a gallery or by an artist. Typically, they are highly forgeable documents that do not include security features in most cases they are issued by the gallery or print house and not signed by the artist. Rarely are the COAs worth the paper they are printed on. COAs are issued for only about 20% of the artwork sold and are normally sent separate from the artwork. In many cases the COA becomes a burden and afterthought for a gallery or artists. Typically, COAs are issued after the payment has been completed, the show is over, and the artwork has shipped to is new owner. Meaning collectors normally do not get their COA until months after the show. In many instances COAs are created after the sale of the artwork or were never intended to be created but were requested by the collector from the gallery or the artists. This results in a COA of lesser quality and one that can be easily copied mostly because it is a burden on the gallery and hastily implemented or one that was forgotten about and delayed because it is not part of their normal process.

COAs are also a single document that is 1:1 bound to a work of art. Traditionally this was achieved by including a photograph and a description of the work on the actual COA. This COA was presented to authenticate that the work was genuine. When ownership was transferred the COA was also transferred along with the artwork. Obviously, there are a lot of flaws in this process, and it is easy to either forge the COA or to forge the artwork and use the original COA. In more recent years there have been solutions that try to improve upon this process by registering the artworks and COAs on a "blockchain" or by creating a harder to forge link between the artwork and COA using RFID chips, QR code stickers that are on the artwork and COA, holograms on the artwork/COA, fibers in the canvas or any other method. These solutions while substantially better are still error prone and can be manipulated by cloning the RFID chip, by putting new stickers on forgeries, by coping the COA/artwork and QR Code in its entirety, or any other creative work around. The systems can also fail if the RFID is lost, the sticker falls off, the physical markers are damaged, etc. In these cases, a new certificate can be printed, or a new sticker placed on the artwork but again these are 1:1 pairing, and the certificate must move with the artwork complicating the process and increasing the probability the pair will be forever separated. Once that bond it broken it is hard to reestablish a trusted provenance and tracking record. It also means the previous owner has no lasting record of their ownership short of photographs or other forms of documentation created from the transaction.

A fifth problem has to do with provenance, forgeries, secondary market sales, and artwork "flipping". This is a broad category but connected. In the absence of a secure COA system, and a shared record of artwork transaction there is a massive potential of abuse within the art community. Forgeries can be created and sold as original works. Forgeries can be created and transferred with "real" COAs duping to buyer into believing they are buying an authentic work while the real painting is held back. Forgeries can be created and sold with false back stories. There is no end to the ways the system can be gamed.

The secondary market is an especially challenging place to participate. The owner can sell their work in an auction house, but that comes with a "buyers" premium often as high as 25%. Online marketplaces are an option as well, but in that scenario, it is buyer beware and many times what the buyer has no guarantee of the authenticity of what they are purchasing. The owner can sell or consign the work through a gallery, but galleries are limited by their reach, and again the owner will pay a considerable commission to the gallery. Finally, the owner of an artwork can sell direct collector to collector, but the owner is again limited in reach, and is consequently selling for less than what the artwork could sell for on the open market. The secondary market is prone to suspect sales and to under-valued sales.

Flipping is where an artwork is bought at one price typically in a "hot" market and immediately resold for 2-10× the price. This normally upsets the market, artists, and or collectors. This is especially common with "edition" released that have excitement around their drop. In these cases, the drop typically sells out within 1 minute and then about 5 minutes later a portion of these works are showing up on eBay and art forums for values many times higher than their sales price. Artists try to create rules and protections to prevent this from happening, but the buyers ignore these rules get access to the works then immediately flip them for a profit. The secure these works using bots to make the purchase or through subterfuge with the artist/gallery.

A sixth and final problem has to do with artists rights, protecting their copyright, usage rights, and resell commissions. Today there is no way to enforce these rules or to get collectors to agree to the terms that are within the artists rights.

BRIEF SUMMARY OF THE INVENTION

Systems and methods for creating, maintaining, and transferring digital records associated with an artwork are described herein. A server may receive, over a network connection, a request to transfer ownership of the artwork from a selling user to a second user. The request may include an identification of a universal art record stored on the server, where the universal art record is associated with the artwork and is one of a plurality of universal art records stored in a database on the server. In response to receiving the request, the server may transmit a request to associate the universal art record with the second user, where the request to associate is transmitted to a computing device of the second user over the network connection.

In response to transmitting the request to associate the universal art record with the second user, the server may receive confirmation that the second user wishes to acquire the artwork. The server may also transfer confirmation codes to each of the second user and a named user via predetermined channels associated with each of the second user and the named user, where the predetermined channels are external to client applications used by each of the second user and the named user for other transfer-related messages. The named user may be identified as a current owner of the artwork within an ownership field of the universal art record. When the transfer confirmation codes are received back from both the second user and the named user (which, for the latter, may be contingent on a payment being received via a virtual marketplace application in some embodiments), the universal art record may be transferred to the second user. This may include, for example, in response to receiving the transfer confirmation codes, modifying the universal art record to indicate in the ownership field that the second user is now the current owner of the artwork. The modification may transfer certain ownership privileges of the universal art record to the second user, such as providing the second user with the ability to access a virtual certificate of authenticity and grant possession access to the universal art record to other users. Other objects, features, and advantages of the present invention will become apparent upon consideration of the following detailed description and the accompanying drawings, in which like reference designations represent like features throughout the figures.

BRIEF DESCRIPTION OF THE FIGURES

FIGS. 13A-13C are screenshots from a mobile application displaying interfaces for transfer of a universal art record by the record owner may be performed, according to various embodiments.

FIGS. 14A-14D are screenshots from a mobile application displaying interfaces for transfer of a universal art record to a second user, according to various embodiments.

DETAILED DESCRIPTION

Figure 1:
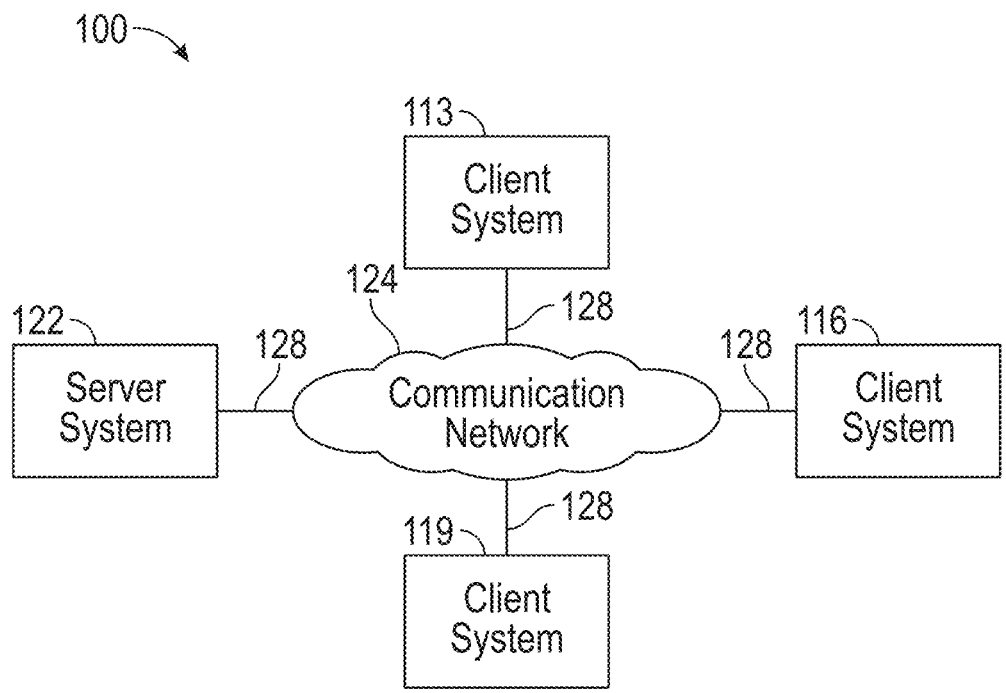
FIG. 1 shows a block diagram of a client-server system and network in which an embodiment of the invention may be implemented.

A unified system is described herein that benefits every party in the art world: artists, sellers (galleries, auction houses, art fairs), and buyers (collectors). The system provides a "unified art record" (UAR) for each artwork registered therein. The UAR may be a flexible data container that houses critical information about an individual work of art. The UAR provides different functionality, utility, and value to its holder depending on the holder's user class (for example artist, gallery, appraiser, collector). The UAR may be held/owned by more than one user at a time. The UAR can be created by any user class. A confidence level is assigned to the UAR and is determined by the user creating the UAR. This confidence can be upgraded by higher ranking user classes certifying the UAR. A UAR not only can be held/owned by multiple users, but it can also be viewed/shared with even more depending on the setting contained within the record.

Unlike conventional inventory database management systems, the UAR management system includes a single UAR for each artwork and one and only one user record for each user of a particular class that all UARs and users are shared across all user classes and user class functionality. For example, different classes of users, such as gallery-type users or collector-type users, may have access to the same subset of fields of a UAR that are set to public for gallery users, and the subset of fields available may further be dictated by whether or not the accessing user is the named current owner, a past owner, or a possessing entity of the artwork associated with the UAR. This is advantageous compared to conventional systems, where each gallery has its own database, with different amounts of information relating to an artwork and duplicated and/or inconsistent information pertaining to the artwork.

A user in possession of the UAR can extract value from it individually or from many UARs linked together. The value and functionality changes based on the user class. The fact that the UAR can be shared between user classes and owned by multiple users at a time allows the system to address many of the problems outlined in the "Background" system. This will be illustrated through multiple example embodiments. Each will demonstrate the functionality of the UAR and when viewed together illustrate the full potential of the UAR and the system it supports.

One example embodiment illustrates the UAR and describes its unique attributes that makes it a powerful container. Another example embodiment illustrates the UAR when it is created by an artist and how the system works as they share the record with a gallery and what the gallery gains from the record. It further illustrates the UAR moving from the gallery to the collector and the benefits the UAR provides the collector.

Another example embodiment illustrates the UAR when it is created by a gallery. It further illustrates the UAR moving from the gallery to the collector and the benefits the UAR provides the collector in this scenario. It also illustrates the UAR moving from the gallery to the artist what happens to the UAR and the value it brings to the artist and to the collector in this scenario.

Another example embodiment illustrates the UAR when it is created by a collector. This example includes a method for certifying a work of art by an artist. Another example embodiment illustrates the UAR when it is created by an artist, who may create UARs for editions of an artwork with multiple copies, artist proofs, and hand embellished editions.

Another example embodiment provides a method for binding a physical artwork to a physical and digital certificate. There is another method within this description that defines a process for preventing fraud and forgeries. There is yet another method that describes a process that prevents users from trying to claim other people's works as their own.

Another example embodiment provides a method for transferring ownership of an artwork from one party to another. In this method, a new form of COA is described, the virtual COA. There is no longer a 1:1 pairing between an artwork and COA; instead, the old certificate expires upon transfer, create a new binding element, and a new certificate may be issued for this artwork. Another example embodiment provides a method for creating a physical certificate for documenting ownership and to assist in transferring ownership.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others. In other embodiments, a native mobile application may be used to select, access, retrieve, or query the information stored by server system 122.

Figure 2:
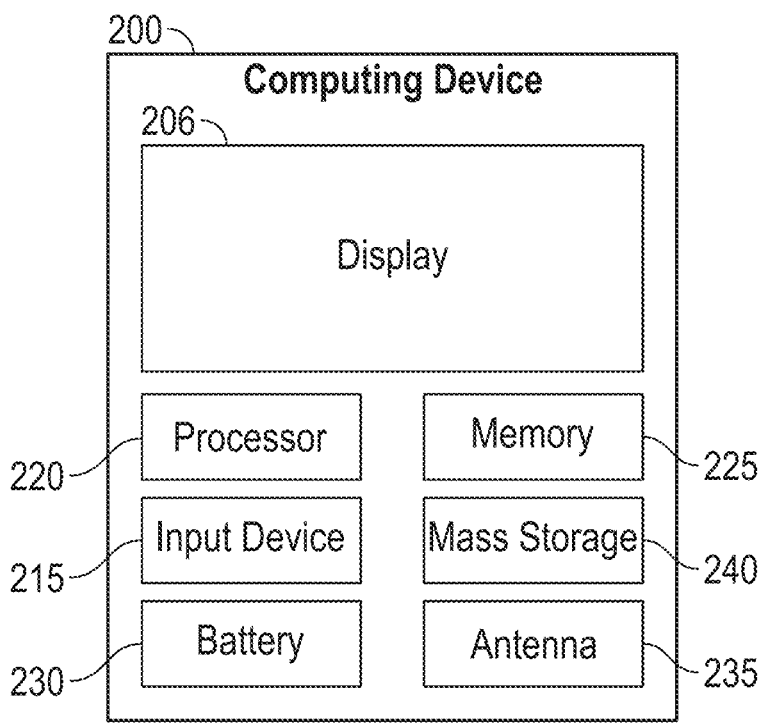
FIG. 2 shows block diagram of an exemplary mobile computing device, according to an embodiment.

FIG. 2 shows a specific embodiment of a computing device 200 such as a mobile client system of the present invention, which may be an example of one of the client systems 113, 116, and 119 of FIG. 1. In an embodiment, a user interfaces with the system through a client system, such as shown in FIG. 2. Mobile client communication or portable electronic device 200 includes a display, screen, or monitor 206 and an input device 215 within a single housing. The housing may also include familiar computer components, some of which are not shown, such as a processor 220, memory 225, battery 230, speaker, transceiver, global positioning satellite (GPS) receiver, antenna 235, microphone, ports, jacks, connectors, camera, input/output (I/O) controller, display adapter, network interface, mass storage devices 240, and the like and various combinations thereof. These components may be connected using any interconnection scheme or bus architecture.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or a combination of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache. The computer system shown in FIG. 2B is but an example of a computer system suitable for use with the present invention. Other configurations of subsystems suitable for use with the present invention will be readily apparent to one of ordinary skill in the art.

For example, in a specific implementation, the computing device is a mobile communication device such as a smartphone or tablet computer. Some specific examples of smartphones include the Droid Incredible and Google Nexus One, provided by HTC Corporation, the iPhone or iPad, both provided by Apple, and many others. Typically, these mobile or portable computing devices have less resources (e.g., memory, storage, smaller screens, or processing power) than a desktop computer. Further, such mobile or portable computing devices are designed to be powered primarily by a battery, rather than being constantly plugged in to a power outlet as in the case of a desktop computer. So, given these differences between portable and non-portable computing devices, it is generally desirable that applications on portable computing devices be small and lightweight (e.g., consume relatively fewer resources as compared to non-portable computing devices). The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with non-transitory computer-readable medium. Non-transitory computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android® system, iPhone® OS (i.e., iOS®), Symbian®, BlackBerry OS, Garnet OS, webOS, Mer, Maemo®, Tizen®, or BREW® OS. An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the mobile device or portable computer device may be connected to a network and may interface to other computers using this network. The network may be an intranet, internet, or the Internet, among others. The network may be a wired network (e.g., using copper), telephone network, packet network, an optical network (e.g., using optical fiber), mobile network, or a wireless network, or any combination of these. For example, data and other information may be passed between the mobile device or portable computer and components (or steps) of a system useful in practicing the invention using a mobile network employing a protocol such as code division multiple access (CDMA), Global System for Mobile Communications/General packet radio service (GSM)/(GPRS), Worldwide Interoperability for Microwave Access (WiMAX), or 3GPP Long Term Evolution (LTE) or a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers, or from mobile communications devices to other mobile communications devices.

Figure 3:
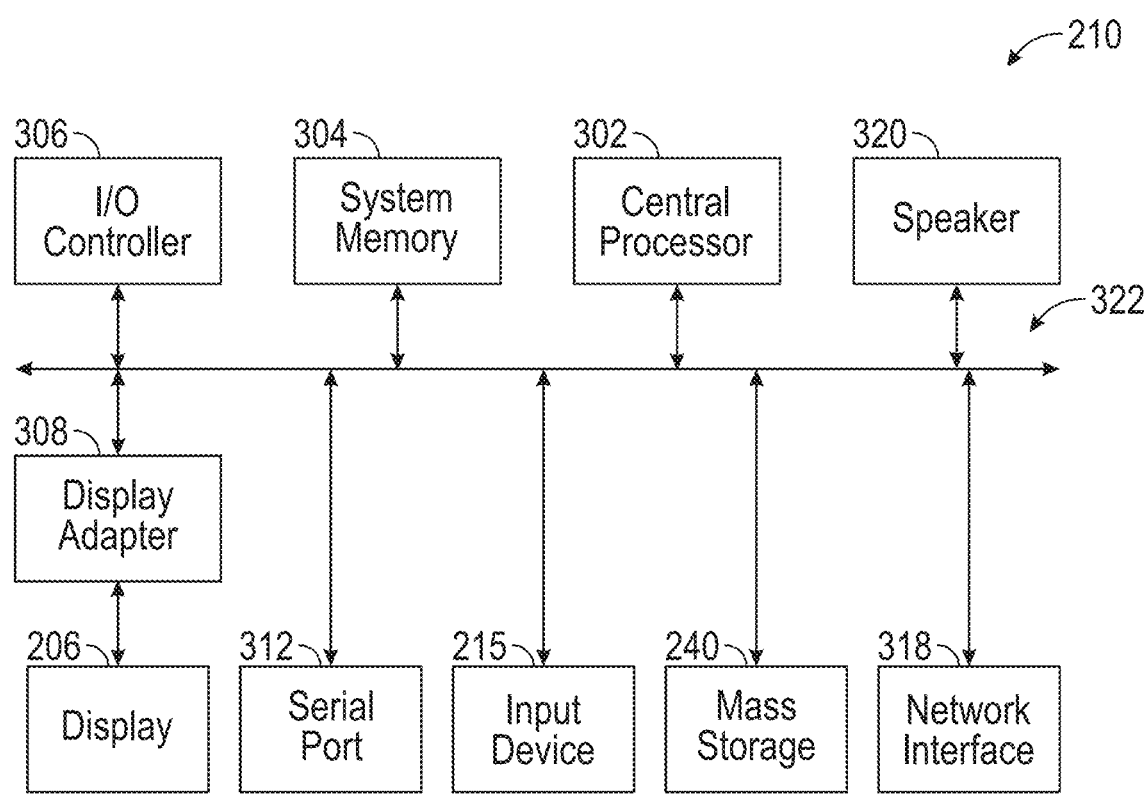
FIG. 3 shows a system block diagram of a computing device, according to an embodiment.

FIG. 3 shows a system block diagram 300 of computing device 210. As in FIG. 2, computer system 210 includes display 206, input device 215, and mass storage devices 240. Mobile computer system 210 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 210 shown in FIG. 2 is but an example of a suitable computer system. Other configurations of subsystems suitable for use will be readily apparent to one of ordinary skill in the art.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
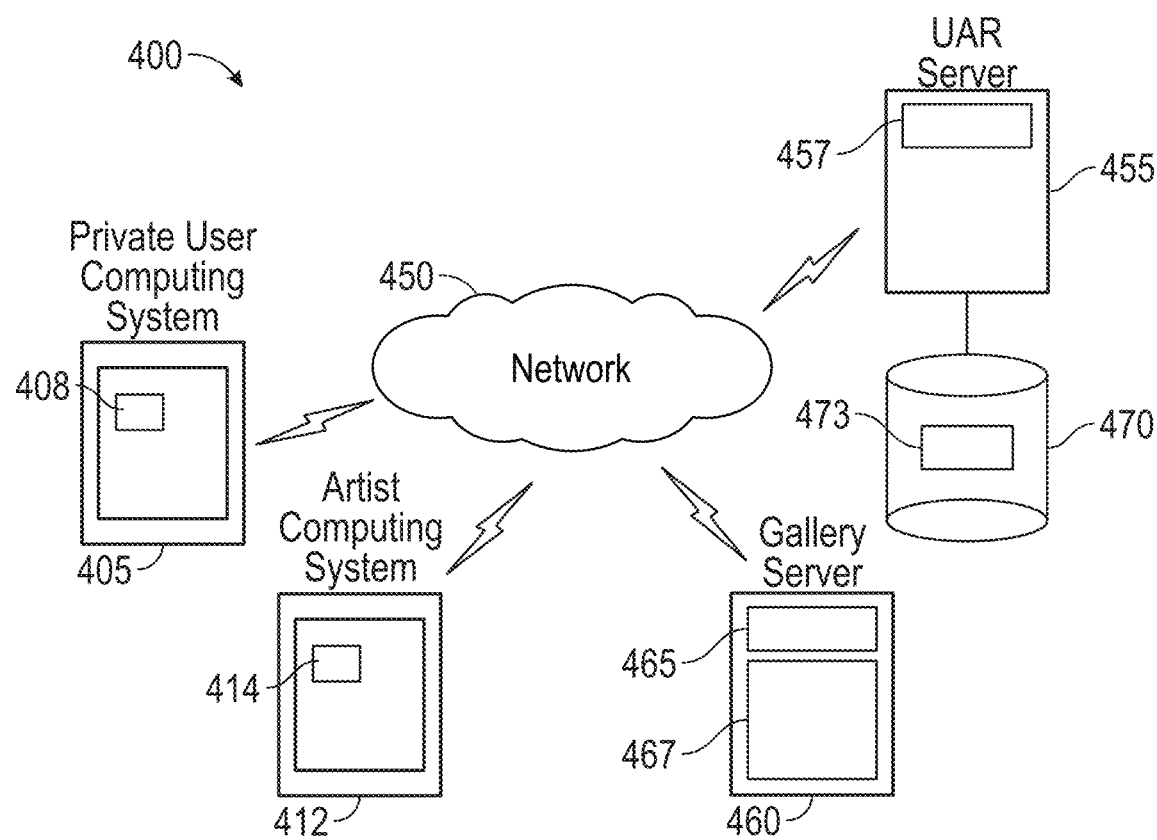
FIG. 4 shows a block diagram of a system architecture for a system for maintaining and transferring digital records associated with an artwork, according to an embodiment.

FIG. 4 shows a block diagram of a system architecture for a system 400 for maintaining and transferring ownership privileges of digital records associated with an artwork, according to an embodiment. Network environment 400 includes computing systems 405 and 412, which may be mobile computing systems. The computing systems 405 and 412 may be connected to the network 450 via a cellular connection or via a Wi-Fi router (not shown). The network 450 may be the Internet. The computing systems 405 and 412 may be coupled with one or more server computing systems 455 and 460 via the network 250.

The UAR server 455 may be in communication with a plurality of user devices over network 450. Each user computing system, similarly to computing system 405, may be associated with a user and may include client application module 408. A user may use the user computing system 405 and the client application module 408 to connect to and communicate with the UAR server computing system 455 (also referred to as the database server) and log into UAR management module 457 (which may be an application running on the database server 455 that facilitates the steps described herein). Artists, a particular type of user, may similarly use client application module 414 to connect to and communicate with the UAR server computing system 455. The user and/or artist may transmit data to the database server 455 and may make subsequent requests for UAR data from the database server 455. The database server 455 may store database 470, which may store UAR data 473 for multiple users. The database server 455 may be associated with an entity.

The database server 455 may be coupled with the gallery server computing system 460 configured with gallery client application 465. The gallery server 460 may also be associated with gallery tools 467, which may be a separate application or applications used to manage various collections of artworks associated with UARs stored in UAR database 470. The gallery tools 467 may be implemented separately on the gallery server 460 as shown, or may be integrated into the database server 455 and provided as a separate service to gallery-type users.

Figure 5:
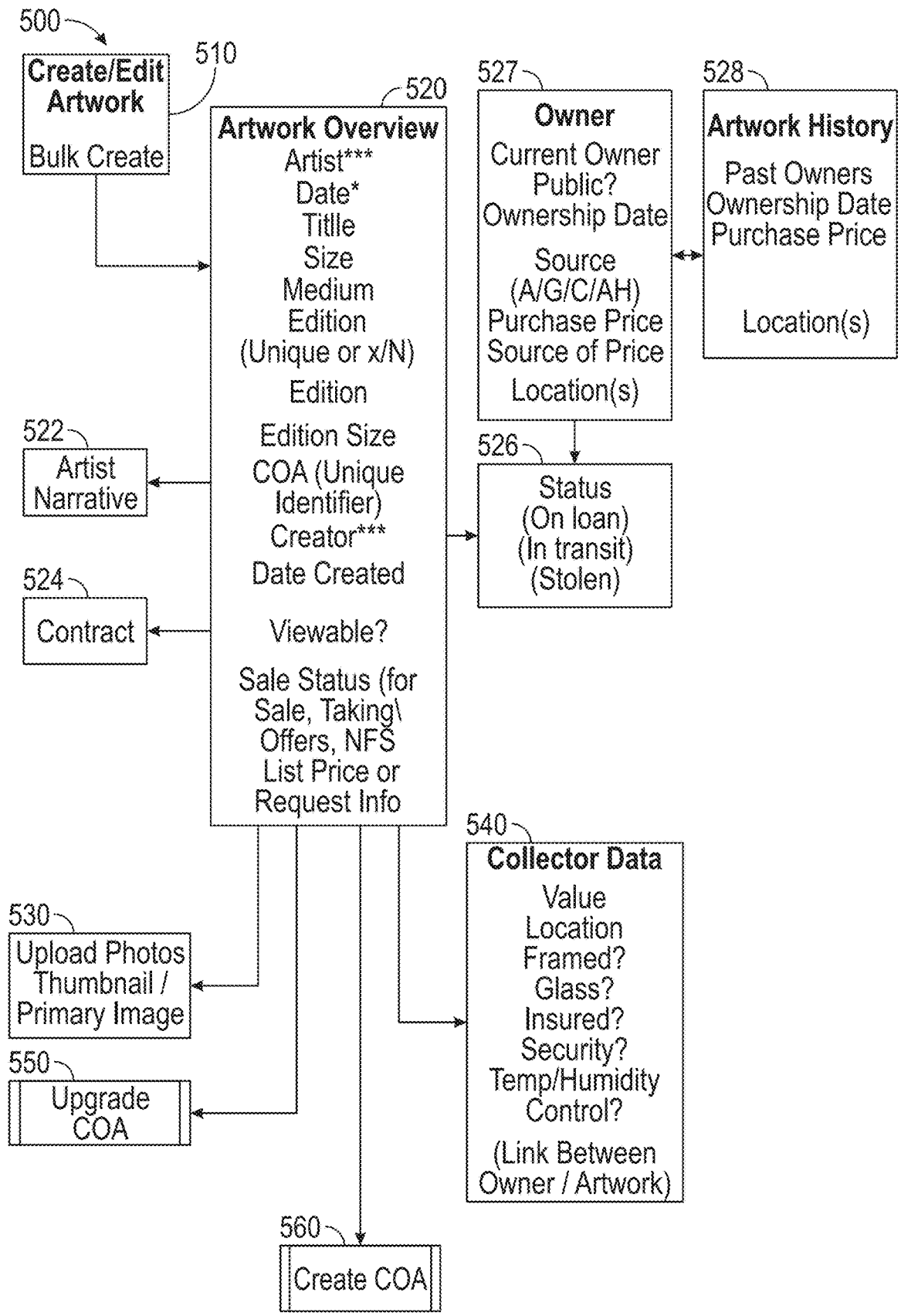
FIG. 5 shows a block diagram illustrating a universal art record and various functionalities available to an owner of the universal art record, according to various embodiments.

FIG. 5 shows a block diagram 500 illustrating a universal art record 520 and various functionalities available to an owner of the universal art record, according to various embodiments. The list below outlines the general components of a Universal Art Record (UAR) 520. The UAR 520 is a container that holds multiple attributes all related to a physical work of art. The UAR 520 is an evolving record that can have new items attached to it over the lifetime of the artwork. The UAR and the system behind it allows those with ownership privileges or possession privileges of the UAR to extract information from the record utilize that to data to receive utility and value. The utility and value can differ greatly by user type. Fields of the UAR may include (some of which are shown in UAR 520):

Confidence
Container:
  a. Photo(s)
  b. Information
    i. Artist
    ii. Title
    iii. Year
    iv. Size
    v. Medium
    vi. Type
    vii. Artist Signature
  c. Gallery
    i. Show
  d. Location tracking
  e. Price
    i. Price History
  f. Privacy
  g. COA
    i. AlwaysArt
    ii. Others
  h. Owner
    i. Previous Owner(s)
  i. Ownership %
  j. Number of owners
  k. Possession
  l. Contracts
  m. Time lock
  n. NFT
  o. Interest log
Group
Multi-ownership
Show set up As a container, the UAR is adaptable and it can house many fields related to the work of art not just the description of it. The interest log, for example, is a feature a gallery would want associated with the UAR 520. The gallery user may transmit a document or interactive catalog to collectors. The collectors may make purchases, and the catalog may be updated in real time, or express interest to the gallery user. The gallery user may insert notes regarding which collectors are interested within the UAR 520, assign priorities to the collectors based on predetermined metrics, etc. A UAR 520 may also house the NFTs or the wallet ID for an NFT so the collector's catalog may house their complete digital and physical art collection in one data structure. A show set up field may provide the ability to extract data to dynamically create the labels that go on the walls, the presages catalog, the individual tear sheets about the works, the interest listed, etc. A partial ownership field may provide the ability for multiple collectors to be owners of the UAR, with percentage-based ownership, and they can sell and transfer their interest but not affect the other owners.

UAR 520 may be generated by a user accessing the create/edit function 510 from a user interface. As shown, a bulk create function may be provided as well for creating a plurality of UARs (e.g., when a user wants to create UARs for a set of prints, for example). After the initial record is created, the artist can add fields to the record in any order preferred by the user. These fields include, as shown in UAR 520, photographs of the artwork, information about the artwork such as: artist, title, year, medium, size, type of artwork, signature, price, sales status, etc.

UAR 520 may include an art record component (including the fields displayed in UAR 520 and discussed above) and an ownership record component 527. The ownership record component 527 may include the ownership field as shown, displaying the named user that is the current owner of the UAR 520. In some embodiments, the ownership record 527 is created automatically in response to accessing the create artwork process 510, and initially the ownership field is set to be the user that created the UAR 520. The ownership record 527 may include two components, indicated by separate fields: "Ownership" and "Possession." The ownership field identifies the current owner of the artwork, and grants ownership privileges over the UAR to the named user. As noted above, what an accessing user can do with the UAR is determined by both the user type and the ownership and possession-related fields of the UAR. The intersection between user type and UAR fields is assessed for each accessing user at the time of access, in an embodiment, dictating what fields are viewable, what visibility there is to related records (such as historical ownership, for example, or current location of the artwork), data extraction capabilities, and data manipulation capabilities. Ownership privileges do not mean all attributes of the UAR 520 can be modified after initial creation; only public fields, new fields that have not yet been set/created, or fields designed to be modified are editable. Having a separate possession field allows the named user to "loan" the artwork to other users (e.g., private users or galleries) and to grant view access to the data contained in the UAR, but still maintain ownership privileges even while the artwork is outside their control. This layer of protection provides an irrefutable link that the artwork is owned by the named user, allowing for its reacquisition if it is ever lost, stolen, recovered, or found in a dispute. The status of the artwork may be contained in status record 526, which is associated to the ownership record 527 in the UAR database.

The ownership record component 527 may include a virtual certificate of authenticity that comprises a confidence level of certification assigned based upon which user has transmitted a verification to the server that the universal art record corresponds to the artwork. The virtual certificate of authenticity ("COA") may be created in response to activating the create COA process 560, and may include information from both the ownership record 527 and from historical ownership record 528, which may be linked to the ownership record 527 in the UAR database and includes a list of past owners of the UAR 520. Historical ownership record 528 may be used to create a provenance chain or ownership chain for the artwork and UAR 520, potentially tracing back to the creation of the UAR 520.

The confidence level may be configured into multiple tiers, where any desired ranking system may be used to distinguish between the tiers of certification. In an embodiment, when a UAR is created by an artist the record immediately has the highest confidence level possible. For example, if the confidence is on a 10-point scale, with 1 being low confidence and 10 being high, the record would have a setting of 10/10 in confidence. In another embodiment, confidence may be expressed as one of four levels (e.g., bronze, silver, gold, and platinum), and the artist-created UAR would have the highest degree of confidence, platinum in this case. Gold-level confidence may correspond to a gallery-certified COA, silver-level confidence may correspond to a collector-certified COA, and bronze-level confidence may correspond to an auction-house-certified COA. In another example, a gallery-type user creates the UAR, which will accordingly be assigned a confidence level of 5 out of 10. This lower confidence is used to reflect the record is created by a "trusted" source that is not an artist themselves but higher than other potential creators.

When viewing a UAR 520 on an interface, in addition to modifying the fields listed above, other processes or features may be available to a current named owner of the UAR 520, or other users associated with the UAR (e.g., possessing entities). For example, an artist narrative 522 for the artwork associated with the UAR 520 may be linked to the UAR 520. Similarly, contract 524 may be linked to the UAR 520 and viewed upon selection by the current named owner. Contracts are linked to the UAR so they can be enforceable, as any party interested in acquiring an artwork associated with the UAR may view what conditions limit the selling user's ability to transfer. Contract record 524 may include conditions imposed on a current named owner of the UAR 520 by past owners associated with the UAR, such as a resale lock (preventing retransfer of the UAR 520 for a preset period of time, to avoid flipping of artworks), rights transfers (e.g., a license to use reproductions of an artwork associated with the UAR 520), and/or a royalty agreement transferring a percentage of a transfer value to the original artist associated with the UAR 520. Images of the artwork 530, including a primary image to displayed when UAR 520 is displayed on an interface, a thumbnail image for view in a collection view interface, and additional photographs, may be uploaded by one or more owners of the artwork and stored separately in a container that is linked to the UAR 520. The current named owner of the UAR 520 may also be provided with the rights to trigger process 550 to upgrade the COA; the process for this upgrade is further described below. In addition to the foregoing, a collector record 540 may be associated in the database with the UAR 520. The collector record 540 may include fields for a current value of the artwork associated with UAR 520, if the artwork is framed, what type of glass is used, if the artwork is insured, security measures taken to protect the artwork, temperature and humidity control measures used to preserve the artwork, and the like.

If a collector user-type is the named owner of the UAR, they may add their own components to the UAR (in the form of additional fields, for example) or they can use the created UAR to find similar works, to prove ownership of the artwork associated with the UAR, to value their collection, or to manage their collection. Proof of ownership of the artwork is critical for insurance purposes, when disputes occur, or when trying to recover stolen works. Having a documented ownership along with time stamps allows a collector to protect their investment. Collectors can also transfer ownership and/or possession to other users and the cycle repeats.

Figures 7A, 7B:
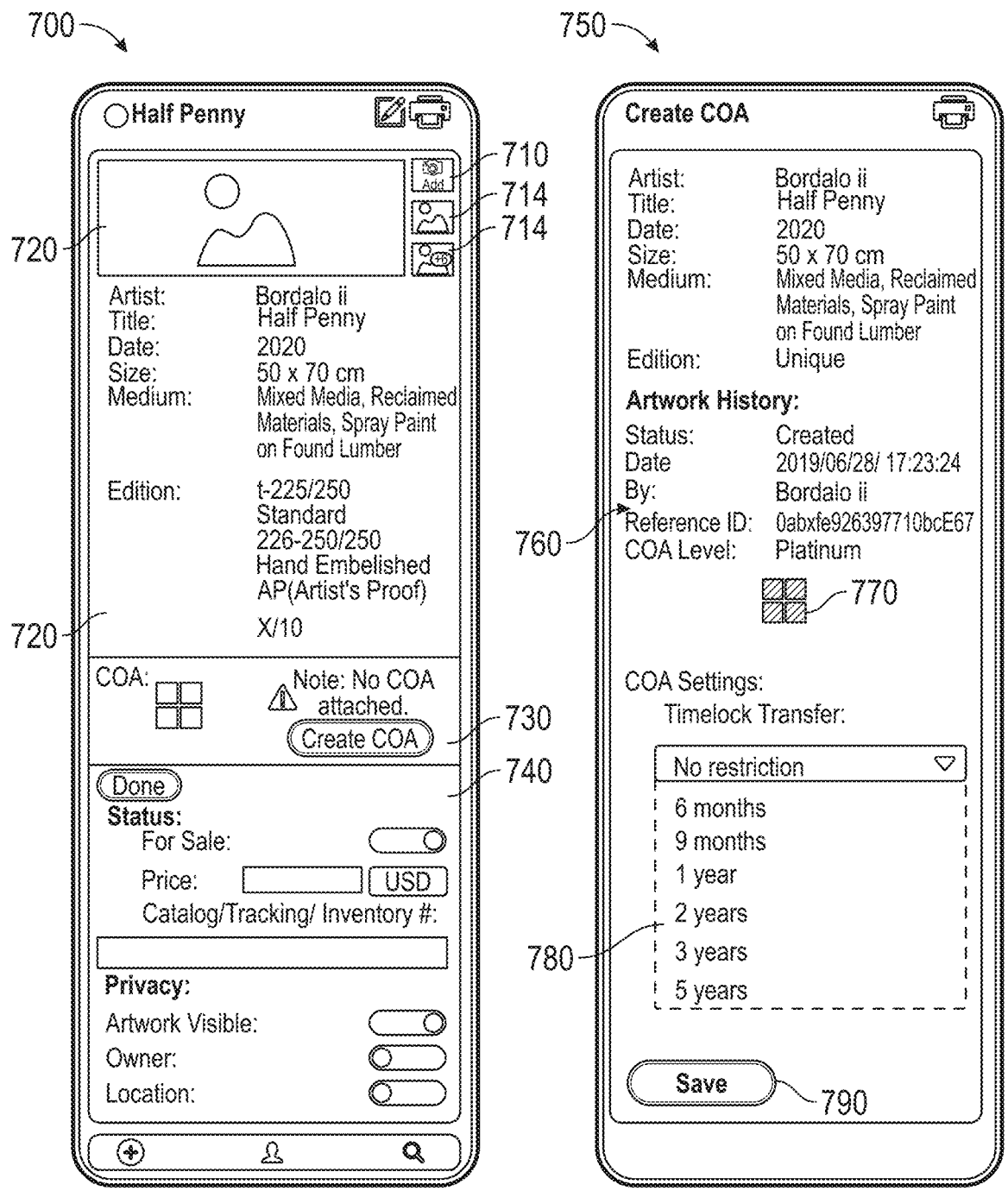
FIGS. 7A-7B are screenshots from a mobile application displaying a process for creating a virtual certificate of authenticity, according to various embodiments.

FIGS. 7A-7B are screenshots 700 and 750 from a mobile application displaying a process for creating a virtual certificate of authenticity, according to various embodiments. Features displayed in screenshots 700 and 750 are exemplary embodiments of the functionality displayed in block diagram 500. For example, primary image 712 and other images 714 are associated with the displayed UAR interface 700 based on the user uploading the images using "add image" process 710 (corresponding to the feature 530 in block diagram 500). UAR interface 700 also displays the fields 720 from the art record component of UAR 520. Also displayed are the status fields 740 (from status record 526) and privacy options dictating what public users (i.e., users who are not the named owner or in possession of the artwork associated with the UAR) of the UAR management system may view from UAR interface 700.

When a user selects the create COA process 730 during the UAR creation process, they may be presented with COA creation interface 750. Exemplary COA creation interface 750 includes the fields 720 from the art record component of UAR 520, but also includes ownership history 760 from historical ownership record 528, including timestamps and other information from significant events for the UAR, including when the UAR was created, transactions of ownership or possession of the UAR, and/or upgrades to the COA. COA creation interface 750 may also include COA level indicator 770, indicating the level of authenticity certified by a user of the UAR management system. In the exemplary embodiment of interface 750, the artist is creating the COA, so the highest certification level is shown for COA level indicator 770. COA creation interface 750 may also include time lock transfer field 780, allowing the UAR creator to lock, or prevent, transfer of the UAR associated with UAR interface 700 for a selectable predetermined time interval. This prevents the UAR from being transferred for a duration set by its creator after the first ownership transfer. For example, a UAR may have a time lock of 9 months when ownership privileges of the UAR are transferred to a new owner of the artwork. Based on the time lock, ownership privileges of the UAR will not be able to be transferred again during the time lock period unless one of two conditions is met: a penalty is paid (this is set by the time lock creator) or its creator removes the time lock. The purpose of the time lock is to protect sellers and prevent flippers from selling artwork prematurely at exorbitantly elevated price points. When the user is satisfied with the field values for COA creation interface 750, they may save the changes using selectable icon 790, thereby creating the COA.

In some embodiments, the UAR may be created by a gallery-type user account, associated with an art gallery that may have both Ownership and Possession of the UAR. As soon as the UAR is complete, the gallery can leverage the UAR to print a show label for the gallery wall, dynamically build a pre-show catalog with interactive features, create individual artwork tear sheets, build show catalogs, create an interactive show experience, and to initiate a transfer of ownership to a collector.

The dynamic pre-show catalog, which may be one of the applications 467 used by gallery server 460 in FIG. 4, may include two powerful modes. A first come first serve mode may allow collectors to view artworks and purchase them on the spot with a "buy now" link. The second mode is a register interest link with this mode a collector can register interest in a work. That interest is registered in the UAR where the gallery can view all collectors who have expressed interest in that artwork and then order them into a purchase priority order. The system will then follow that priority order along with a set of rules offering a chance to purchase the work with little to no human interaction. For example, a priority one buyer might have 36 hours to respond and purchase. Once that time has passed, the priority 2 buyer is automatically notified by the UAR server and given 24 hours to purchase the artwork associated with the UAR. If that time passes, then it moves to the priority 3 buyer with 24 hours and continues until the artwork is sold or the list runs out of interested collectors.

Figure 6:
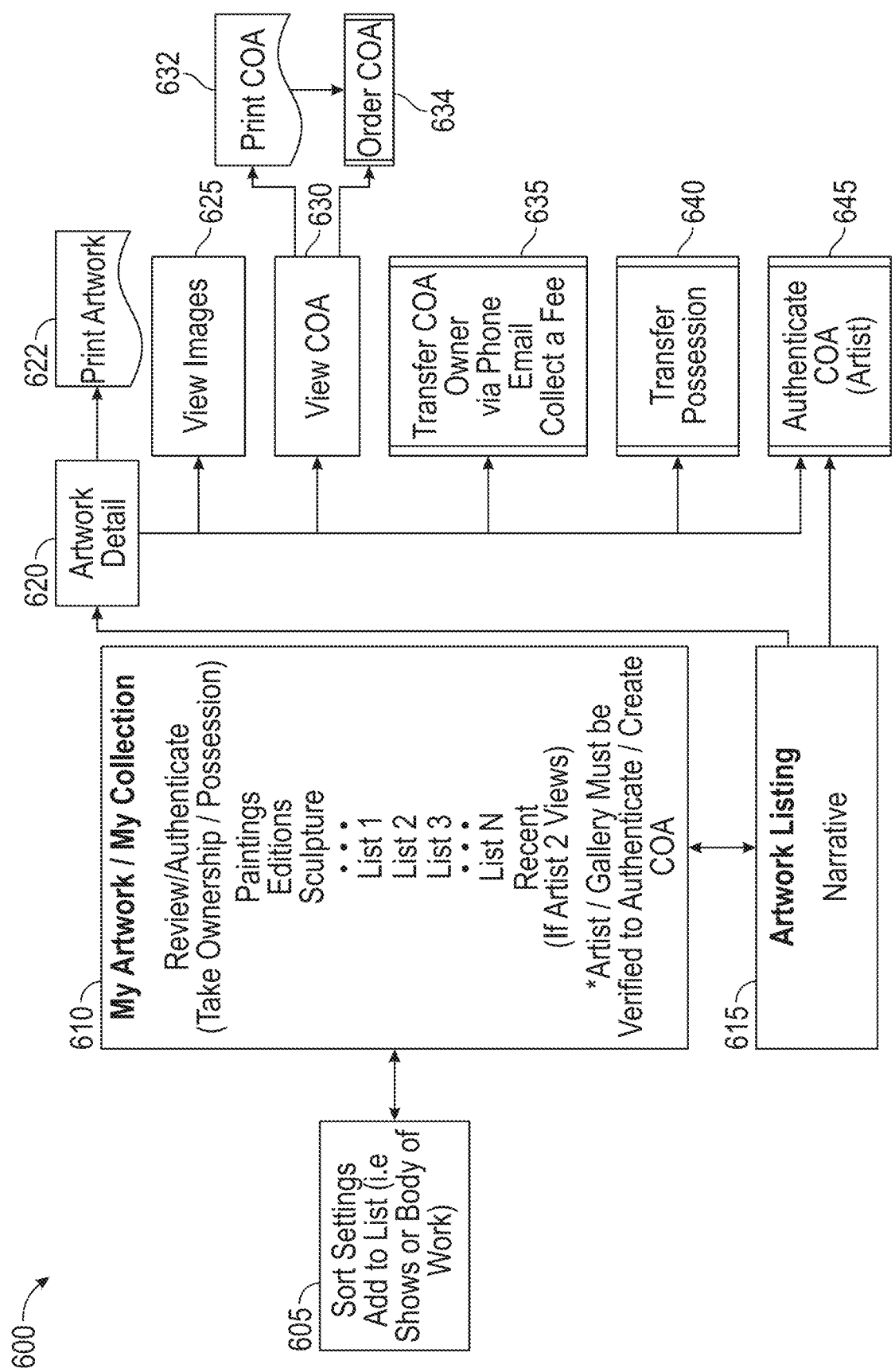
FIG. 6 shows a block diagram illustrating a collection owned by a user and various functionalities available to the owner of the collection, according to various embodiments.

UARs can be singular or grouped together into named collections. These groupings allow the UAR to have even more utility. For example, UARs can be grouped by year, collection, mood, color, show, etc. This additional component of data allows the UARs to be organized and searched in more convenient manner. It also allows a user to transfer possession or ownership of A UAR singularly or as a group. FIG. 6 shows a block diagram 600 illustrating a collection 610 owned by a user and various functionalities available to the owner of the collection, according to various embodiments. Collection 610 may be organized using a series of interfaces viewable by the owner of the collection 610. The owner may be presented as shown with an option to review or authenticate any transfers of ownership or possession of any artwork having a UAR (discussed further below).

UARs for artworks owned as part of the collection 610 may be subdivided based on the type of artwork (paintings, editions [in the case of prints, or other limited releases of the same artwork], sculptures, etc.) Once a type of artwork is selected, a plurality of lists may be presented, each list being a grouping of UARs created by the user. In addition to user-created lists of UARs, a selectable, automatically generated "recent" list may be created that include a predetermined number of most recent UARs added to the collection 610. Also, sort settings 605 may be proved to a user, to allow a user to sort groups of lists by, for example, if the list was part of a show, or a body of work created by a particular artist.

When a listing of UARs is displayed, artwork listing records 615 may be displayed for each UAR in the list. From the artwork listing record 615, which may be similar to record 824 of interface 800 in FIG. 8, a number of selectable icons may be presented. An artwork detail interface 620 may be displayed when a corresponding option (e.g., icon 828) is selected from the artwork listing record 615. The artwork listing interface 615 may display selected fields from the art record component of the UAR. When the artwork detail record 620 is accessed, the user may print an image of the artwork using process 622, view images using process 625, or view the COA using process 630. When viewing the COA after activating the view COA process 630, a user may trigger a process 632 to print the COA and process 634 to order a physical copy of the COA.

Other functions involving the artwork detail record 620 include functions to transfer possession 640 of the artwork associated with the displayed UAR (as opposed to transferring ownership, see FIG. 15 discussed below for an explanation of the possession transfer process), and, when the user is an artist-type entity, the process 645 to authenticate the COA of the artwork, which was created by the artist-type user entity. The transfer ownership process 635 may be available from either one of the artwork detail record 620 or the view COA record 630, and may trigger the transfer of ownership privileges of the UAR process described in further detail below.

Figure 8:
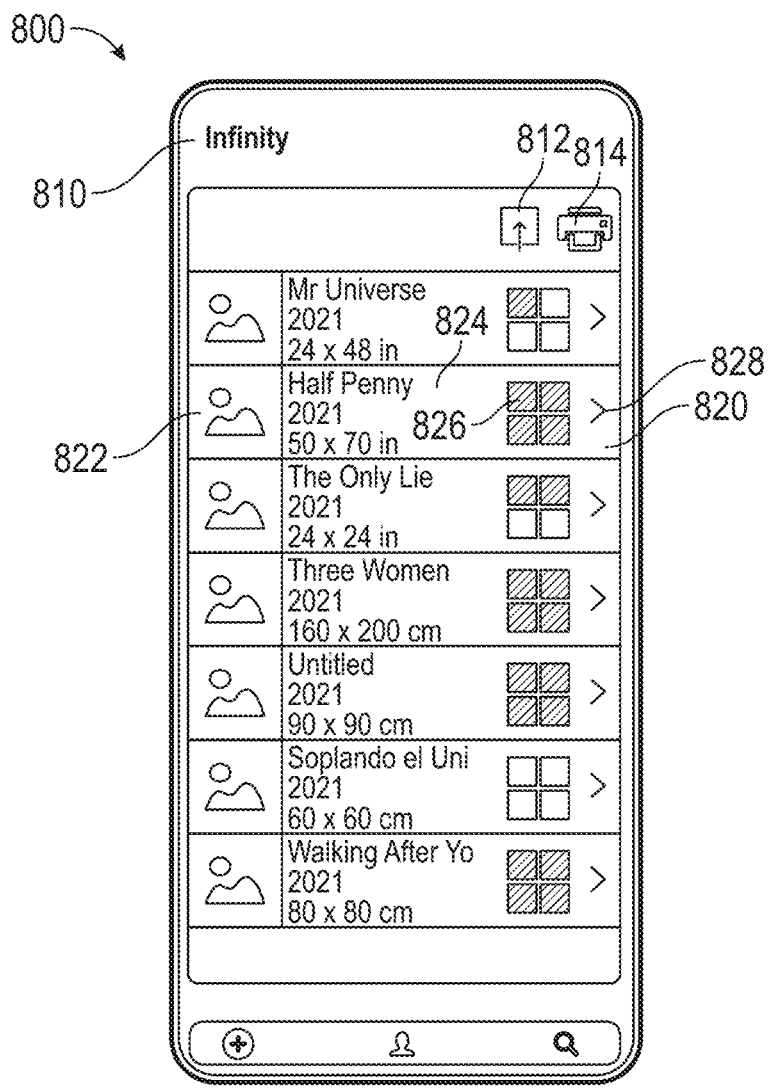
FIG. 8 is a screenshot from a mobile application displaying a collection owned by a user, according to an embodiment.

FIG. 8 is a screenshot 800 from a mobile application displaying a group of UARs, such as one of the lists in collection 610, owned by a user according to an embodiment. The list 810 in collection interface 800 is titled Infinity (which may correspond to an art showing entitled "Infinity," for example), and includes a plurality of UARs, such as UAR 820, corresponding to different artworks in the Infinity list 810. Each UAR may include, as is shown in UAR 820, a thumbnail image 822 of the artwork (if one has been created), selected fields 824 from the art record component of the UAR (e.g., the title, size, and creation date of the artwork), and a visual representation 826 of the authenticity confidence level (platinum, in the case of UAR 820). When a user selects icon 828, the artwork detail interface 620 may be displayed.

Figure 9A:
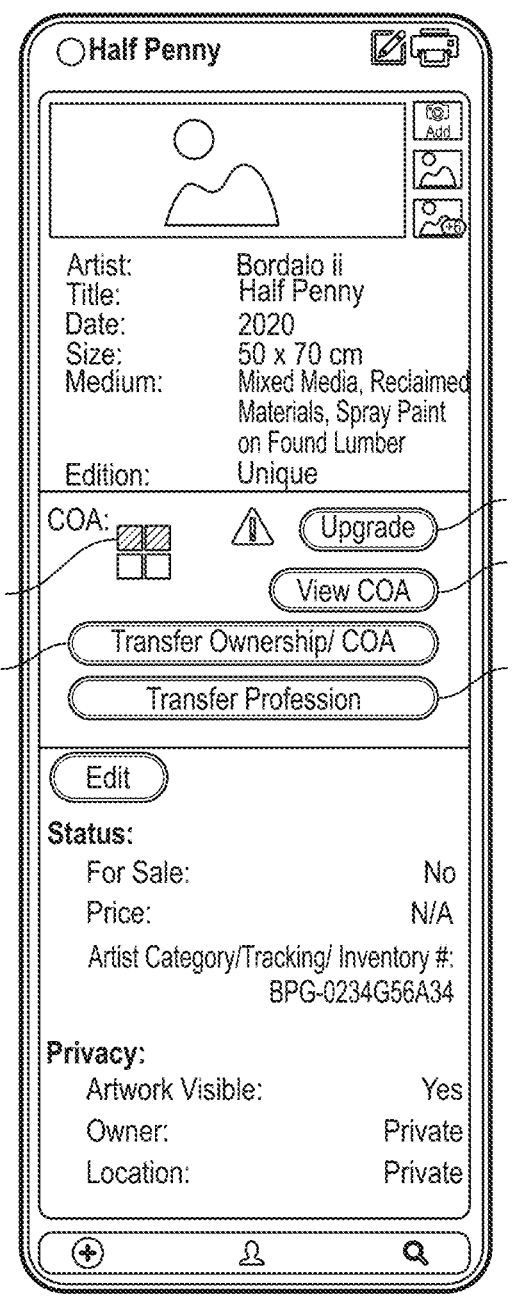
FIGS. 9A-9B are screenshots from a mobile application displaying exemplary artwork detail interfaces, according to various embodiments.
Figure 9B:
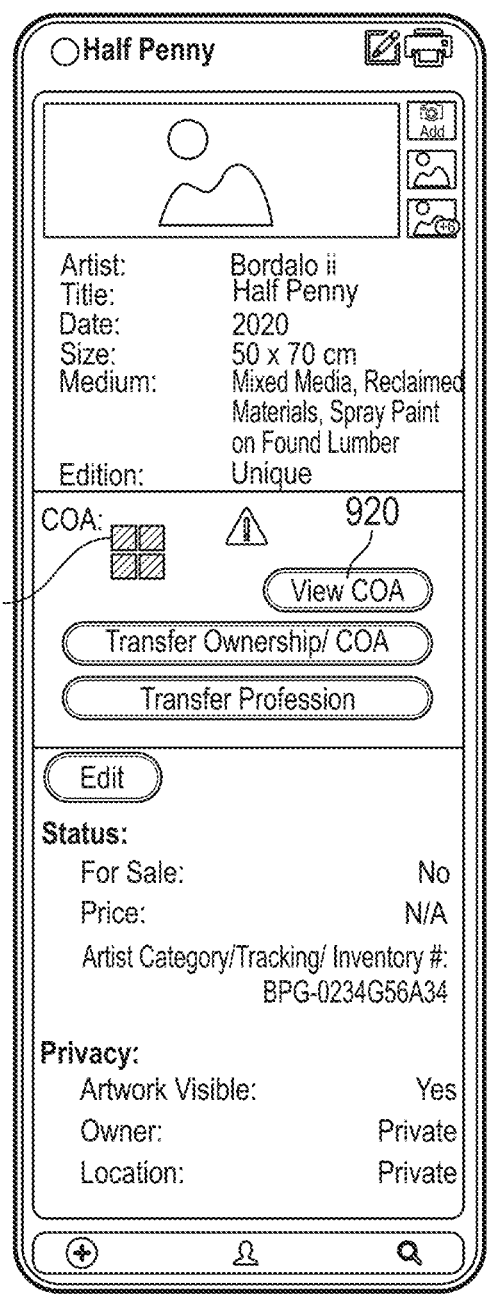

FIGS. 9A-9B are screenshots from a mobile application displaying exemplary artwork detail interfaces 900 and 950, according to various embodiments. Artwork detail interface 900, for the artwork titled "Half Penny," may be displayed on a user computing device in response to selecting icon 828, as described above. The exemplary artwork detail interface 900 includes visual indicator of COA authenticity 910, and a selectable icon to view the COA 920 (corresponding to the view COA feature 630 displayed on the artwork detail interface 620). Another selectable icon 925 is provided to transfer ownership of the UAR, triggering the method 1200 displayed in FIG. 12. An icon 930 is provided as well to transfer possession of the artwork associated with the artwork detail interface 900, which may trigger the method 1500 displayed in FIG. 15.

A selectable icon 915 may also be provided to upgrade the COA level (corresponding to process 550). This may be useful when, for example, a collector creates the UAR. A collector may create a UAR for any artwork in their collection. When a collector creates a UAR it will have a default confidence, which may be two (on a ten-point scale), or silver-level (on a four-tier scale). The UARs track their collection, allow them to sort their collection by any attribute stored in the UAR, lets them prove ownership for insurance purposes, use the UAR for recovery, to find similar works, to value their collection, or to make purchase recommendations. As with the other examples, the collector can transfer ownership and or possession, or can pass the UAR to a gallery or to the identified artists in the UAR for verification/certification. If an artist verifies and certifies the work as authentic two things may happen: 1. The artist permanently gets visibility into the UAR and it shows up in their online catalog and system and 2. The confidence of the UAR gets upgraded to the highest level (platinum, or 10/10). If a gallery certifies the artwork, it may be upgraded to a 5/10 (or gold-level), with the gallery also being given visibility into the UAR.

Figure 10:
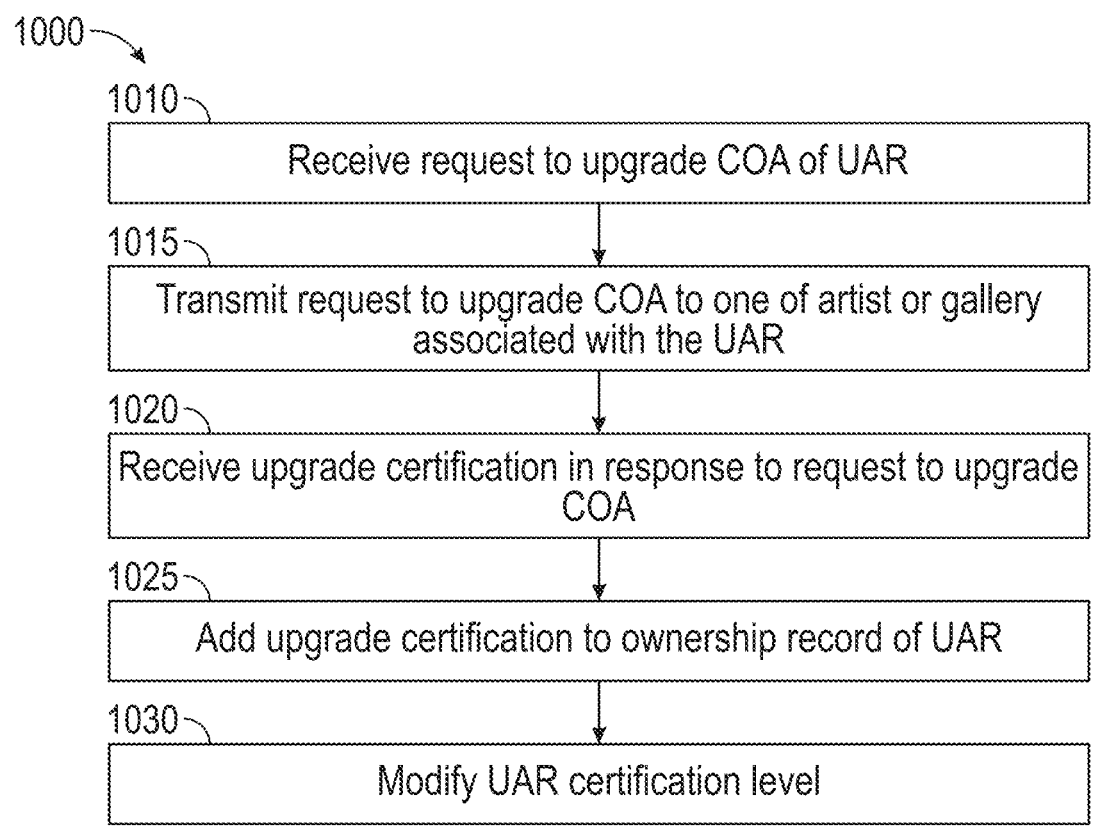
FIG. 10 shows a flow diagram of a method of upgrading a virtual certificate of authenticity, according to an embodiment.

Selection of icon 915 may trigger the upgrade COA process illustrated in FIG. 10. Method 1000, executed by the UAR management server, may be triggered by receiving the request to upgrade the COA of the UAR associated with the artwork detail interface 900 at step 1010. The request may be sent in response to selection of icon 915. In response to receiving the request to upgrade the COA, the server may transmit a request to upgrade the COA to a higher-level authenticator associated with the UAR at step 1015. The higher-level authenticator may be one of a gallery user that is associated with the artwork associated with artwork detail interface 900 (e.g., the gallery from which the artwork was acquired), or an artist user who created the artwork.

In response to receiving the request to upgrade the COA, the higher-level authenticator associated with the UAR may respond with an upgrade certification, which may be received by the server at step 1020. The upgrade certification may be a message transmitted using the client application associated with the higher-level authenticator, for example. The upgrade certification may be added to the ownership record of the UAR at step 1025; for example, information may be automatically populated in the historical ownership record 528 and/or the COA of the UAR in question, including a timestamp associated with the receipt of the upgrade certification. Finally, the UAR certification level may be upgraded for the UAR at step 1030. The upgrade at step 1030 may include upgrading the visual indicator for both the artwork detail interface of the UAR and for the list view displayed in screenshot 800.

Since artists have the highest confidence level in terms of the UAR certification level, the UAR management system may provide measures to protect against user fraudulent activity. For example, when a user registers as an artist-type user account, a verification process may be provided before artist user privileges are given to the account with respect to one or more UARs associated with artworks created by the artist. In an exemplary embodiment, in response to the request to create an artist-type account, one or more existing artist-type users may be automatically transmitted a message asking if they are with the person creating the artist-type account when the request to create the artist-type account. If the existing artist-type user confirms that they are with the user requesting artist-type account privileges, then the server may grant the request. If no existing artist-type user confirms that they are present with the user requesting artist-type account privileges within a predetermined time period, the server may then send a message to the user requesting artist-type account privileges requesting a predetermined number of references. From there, an administrator may review the references once they have been submitted via the client application and provide an approval manually. Other measures that may be used to address potentially fraudulent activity may include requesting government-issued identification information at the time of registration as an artist-type or gallery-type user.

Artwork detail interface 950 illustrates the result of upgrading the UAR certification level as described in method 1000. Visual indicator 960 is upgraded to the highest level (platinum) from its previous silver certification level displayed in indicator 910. Furthermore, a user may select the "view COA" icon 920 to view the automatically populated information relating to the upgraded certification level.

Figure 11:
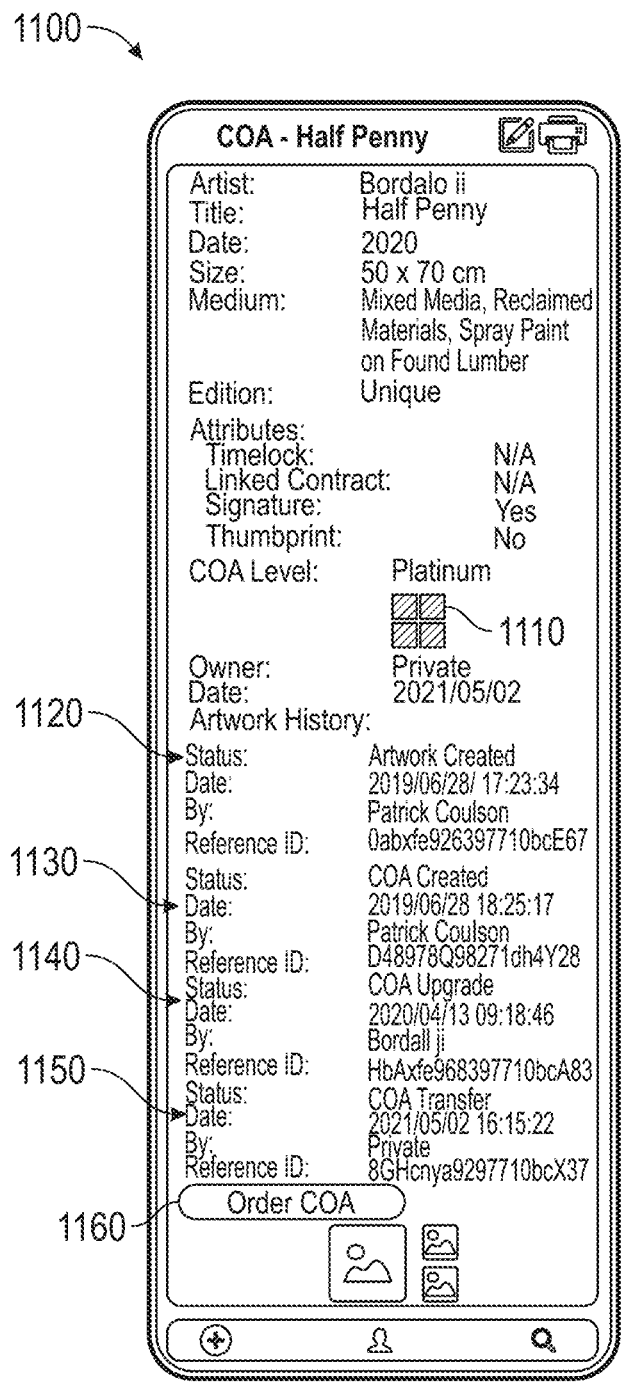
FIG. 11 is a screenshot from a mobile application displaying a virtual certificate of authenticity that has been upgraded, according to an embodiment.

FIG. 11 is a screenshot from a mobile application displaying a virtual COA 1100 that has been upgraded, according to an embodiment. Virtual COA 1100 may be displayed in response to a user selecting view COA icon 920 in artwork detail interface 950 after the UAR certification level has been upgraded. Virtual COA 1100 includes the artwork title and selected fields from the art record component of the UAR. Visual indicator of COA authenticity 1110 is also included, along with a detailed log of ownership history events. Log entry 1120 corresponds to creation of the UAR associated with the COA by a collector, and log entry 1130 corresponds to the creation of the COA by the same collector. Each log entry includes a timestamp associated with the corresponding event, the status, the user identifier associated with the user who triggered the event, and a reference ID number allowing a technician to identify events without locating the corresponding COA.

Log entry 1140 may correspond to the UAR certification level upgrade, as described in method 1000. As shown in the exemplary embodiment of virtual COA 1100, the artist has performed the upgrade of the UAR certification level. The last log entry 1150 corresponds to a transfer of ownership privileges of the UAR. The buyer of the artwork associated with the UAR is set to private, which prevents public users of the UAR management system, who are not the currently named owner, from viewing the buyer of the artwork, in accordance with the privacy settings of the buyer user account. If the named owner of the UAR wishes to obtain a physical copy of the virtual COA 1100, they may do so by selecting the order COA icon 1160 on the virtual COA 1100. This may trigger the UAR server to transmit a message to request the physical COA be printed and sent to the named owner of the UAR by any suitable method (e.g., by mail, by fax, etc.).

Figure 12:
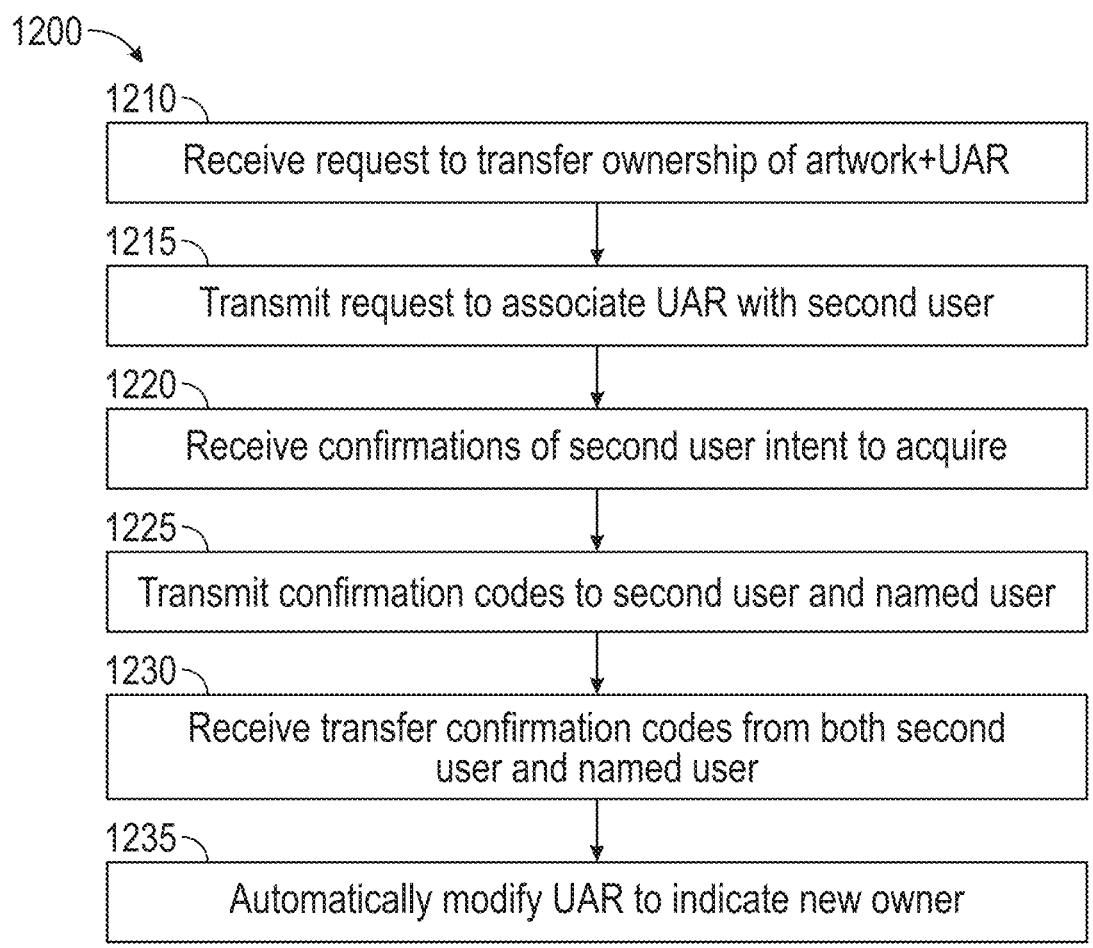
FIG. 12 shows a flow diagram of a method for transferring ownership of a universal art record, according to an embodiment.

FIG. 12 shows a flow diagram of a method 1200 for transferring ownership privileges of a universal art record, according to an embodiment. When artwork is sold or transferred to a new owner, the work of art and current COA certificate are shown to the user to prove authenticity. If the new owner is satisfied with the authenticity, the ownership privileges are transferred in one of two ways (or a combination of both). The first method occurs via a web page or mobile application and is displayed in method 1200. The owner of an artwork initiates the transfer of ownership privileges to the new owner. The current named owner follows a link, verifies their 2-factor authentication method. The buyer may receive a secondary link and code, enter this information and the ownership is transferred to their profile. After the ownership transfer occurs, a new ownership certificate is minted and bound to the artwork. The old certificate is expired and essentially becomes a souvenir and legacy document. If a gallery is initiating the transfer of an artwork (instead of an artist or a collector, after an artwork is sold, the gallery initiates a transfer of ownership to the collector. Since ownership is in the possession of the artists, the system makes a request to the artists to accept the ownership transfer and the possession is transferred from the gallery. Now ownership and possession privileges have been transferred to the new owner of the artwork, leaving the artist and gallery with "viewing" privileges. An artist of an artwork may be given greater viewing access to the UAR despite no longer owning the artwork due to their continuing interest in tracking the artwork (e.g., the ability to view any contracts associated with the artwork, particularly royalty-related provisions, the ability to view the current location field of the artwork, the address field off the current named owner, the dates and names of past transactions related to the UAR, etc.). In some embodiments, galleries may be given similar privileges.

The second method of transfer occurs via the physical COA document. In this scenario the owner transfers ownership privileges to the new owner via a transfer form attached to the current ownership document. The owner enters their name, the buyers name, signs, and dates the ownership transfer form. The owner then detaches the ownership form and gives it to the new owner keeping the bottom section as a souvenir. The new owner takes this form, goes to the app or website and enters the certificate number and a concealed confirmation code. These two in combination prove ownership transfer allowing the new buyer to register the artwork into their name in the UAR and rebind a new certificate to the user and artwork continuing the provenance chain unbroken.

Regarding the computer-implemented transfer process, a server may receive, over a network connection, a request to transfer ownership privileges of the artwork from a selling user to a second user at step 1210. The request may include an identification of a UAR stored on the server, where the UAR is associated with the artwork and is one of a plurality of UARs stored in a database on the server. FIG. 13A illustrates an interface 1300 for generating the request to transfer ownership of the artwork and UAR used by the selling user, which may be the current owner or a gallery-type user selling the artwork associated with the UAR on the current owner's behalf. The selling user may select a communications channel for the server to transmit a request to associate the UAR with the second user between SMS messaging icon 1305 and e-mail messaging icon 1310 (though any suitable communications channel may be used, such as an instant messenger application, for example). Depending on which channel is selected, fillable field 1315 allows the selling user to provide an identifier to contact the second user with (e.g., phone number or e-mail address). Image 1325 of the artwork associated with the UAR being transferred is also provided, to further provide the selling user that they are transferring the correct artwork. When the selling user is ready to transmit the request to transfer ownership privileges to the server, they may select the continue button 1320.

In response to receiving the request, the server may transmit a request to associate the UAR with the second user at step 1215, where the request to associate is transmitted to a computing device of the second user over the network connection. The association may include transferring ownership privileges from the named current owner of the UAR to the second user, for example. FIG. 14A illustrates an exemplary request to associate the UAR with the second user, as seen in a client application interface 1400 displayed on the computing device of the second user. The interface 1400 shows exemplary request to associate the UAR with the second user with various fields from the art record component of the UAR to identify the artwork being transferred along with the UAR. The visual indicator of UAR authenticity 1425 is also included to provide further transparency to the second user before completing the transaction. When the second user is ready to proceed, they may select button 1410.

In response to transmitting the request to associate the universal art record with the second user, the server may receive confirmation that the second user wishes to acquire the artwork at step 1220. If the second user does not have an account with the UAR management system, a link may be sent to the second user's email address or telephone number via SMS allowing them to create an account (not shown in method 1200). The second user may then be asked to verify the authenticity of the account (and that the second user has possession of the account) via two-factor authentication using another communications channel before the second user transmits confirmation of their intent to acquire the artwork via the client application. Confirmation that the second user wishes to acquire the artwork may be received within the client application, via selection of button 1410, for example. The second user may then select the non-client application channel to receive a transfer code used to confirm the transaction. The transfer code is provided outside of the client application, to further enhance the reliability of the transfer process, as part of a two-factor authentication process as discussed below. In certain embodiments the transfer code for the second user may be used to confirm possession of the artwork associated with the UAR. This may be done, for example, by setting a predetermined delay on the server before sending the transfer code.

FIG. 14B illustrates an exemplary interface 1430 displayed on the computing device of the second user for providing confirmation of possession of an artwork associated with a UAR that is being transferred. Interface 1430 includes step indicator 1435 informing the second user that there are three steps in the exemplary confirmation process. The second user may select a communications channel for the server to transmit the confirmation of possession between SMS messaging icon 1440 and e-mail messaging icon 1445 (though any suitable communications channel may be used, such as an instant messenger application, for example, provided that the confirmation of possession is made outside of the client application as part of a 2-factor authentication process). Depending on which channel is selected, fillable field 1315 allows the second user to provide an identifier of where they wish to receive the confirmation of possession code (e.g., phone number or e-mail address). Image 1457 of the artwork associated with the UAR being transferred is also provided, to further provide the second user that they are receiving the correct artwork and UAR. When the second user is ready to request the confirmation of possession code from the server, they may select the continue button 1455.

The server may then transmit transfer codes and confirmation requests to a named user and the second user, outside of the respective client applications of the users, as part of two-factor authentications of both sides of the UAR transfer at step 1225. The named user may be identified as a current owner of the artwork within an ownership field of the universal art record. FIG. 13B displays an exemplary interface 1330 for the named user to enter their transfer confirmation code. Fillable field 1335 allows the named user to input a six-digit transfer confirmation code received by a predetermined channel that is external to the client application of the named user. In the exemplary embodiment, the predetermined channel to receive the transfer code of the named user is SMS messaging to the named user's telephone number. After entering the transfer code, the named user may confirm the transfer by selecting button 1340. In some embodiments, the named user may confirm receipt of payment (via a separate interface or button on the interface 1330) prior to entering the transfer code. This payment may be processed by an online marketplace in communication with the UAR management system in some embodiments.

On the buyer side, FIG. 14C displays an exemplary interface 1460 for the second user to enter their transfer confirmation code. Fillable field 1470 allows the second user to input a six-digit transfer confirmation code (though any number of digits may be used, six are used in the exemplary embodiment) received by a predetermined channel that is external to the client application of the second user. In the exemplary embodiment, the predetermined channel to receive the transfer code of the second user is SMS messaging to the second user's telephone number. After entering the transfer code, the second user may confirm the transfer by selecting button 1475.

At step 1230, transfer confirmation codes may be received from both the named user and the second user. Based on receiving the two-factor authentication transfer codes from both users, the universal art record may be transferred to the second user. Accordingly, the UAR is automatically modified at step 1235 to indicate in the ownership field that the second user is now the current owner of the artwork in response to receiving the two-factor confirmations from both the named user and the second user. Messages may be sent to the selling user, the named user, and/or the second user in response to the modification of the UAR. FIG. 13C illustrates an interface 1360 displayable to one or both of the selling user and the named user in response to the UAR being modified at step 1230. Narrative message 1365 explains that the transfer has been implemented, while selection of button 1370 takes the user back to the home page of the client application. The modification to add the second user as the new current owner of the UAR transfers ownership privileges of the UAR to the second user. As described, these privileges include providing the second user with the ability to access a virtual COA and grant possession access to the UAR to other users, which are unavailable to other users, including past owners of the UAR or possessing entities, such as a gallery that facilitated a past transaction involving the artwork associated with the UAR.

Figure 14D:
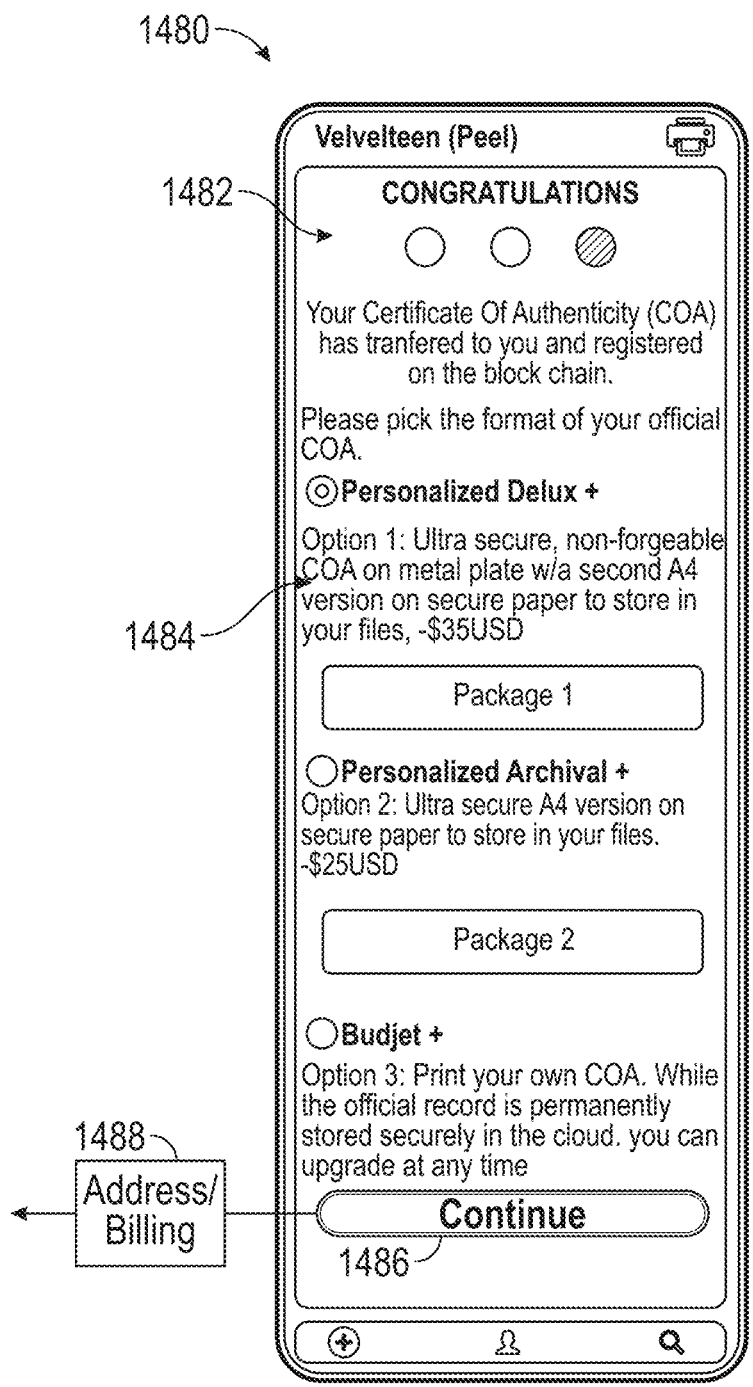

Likewise, FIG. 14D illustrates exemplary interface 1480 explaining to the second user that their acquisition of the UAR is complete. In addition to the narrative 1482 explaining that the transfer is complete (and the transaction has been added to a blockchain to provide further evidence of the transfer, in accordance with certain embodiments), icons 1484 are provided for the second user to order a physical version of the new COA. Once the second user selects from one of the provided options, they may confirm the selection by selecting button 1486. If one of the mail-order options are selected, a message is transmitted from the client application to the server including the second user's address information so that address/billing services 1488 may be provided with adequate information to send the physical COA.

In some embodiments, as part of the ownership transfer process and if fraud protection is applied to the artwork, the new owner can also go through the artwork authentication process to verify the work is the original rather than a forgery and after taking ownership can go through a new image bonding process to create a new set of bounding/authentication digital fingerprints. Using the exemplary anti-forgery measures, the system may link a virtual COA to a painting using photographical evidence, and by creating a non-forgeable digital fingerprint. This digital "bonding" can be reapplied at any time to ensure it is always accurate. This is achieved through a multistep process where a photograph is taken of the artwork. The computer system analyses the photograph and selects 1:n random macro sections of the painting and displays them on the screen. The user must then take close-up pictures of these sections where the camera takes pictures of the artwork but also the texture of the canvas/paper/medium and uses the cameras sensors to analyze texture, depth, and other attributes of the artwork. This data is stored in the UAR (e.g., as one of the images associated with the UAR) and linked to the ownership record ID, allowing for retrieval and verification of an artwork. After this process is complete the UAR confidence level has a new identifier showing that the record also has fraud protection applied.

Verification can occur at any time. The owner can activate authentication on the artwork and grant access to another user. This user would then be shown 1:n sections of the painting to take macro pictures of. After taking the pictures the system would analyze the pictures vs. the stored images data and respond with a confidence rating on the painting determining if it is the painting linked to the existing UAR. After this step has been completed a new binding process could be implemented if wanted.

To prevent users from "stealing" or creating UARs/bindings to pictures outside of their control (i.e., paintings in galleries, in museums, or in other people's homes) the system can use a smart grid system. This is a unique grid that is created for a user of this system. This grid has horizontal and vertical markers and is unique to each user. This grid can be tucked into the corner of a painting before the primary photo is taken and it serves 3 purposes: 1. it identifies who took the picture, and timestamps the creation, 2. it auto determines the height and width of the artwork, and 3. it prevents covert image documentation by creating a process that is conspicuous in a public setting. A user would have to have private access to the location and the grid of the user to create a "secure" and non-disputable UAR.

As noted above, transfers of UARs for artworks may be facilitated by galleries being the selling user in the transaction process. The UARs may be used to track the fact that the gallery has physical possession of the artwork, creating a chain of possession that may be needed in the event the artwork is lost or damaged in some way, for example. Such a chain of possession may also be helpful for knowing when the artwork was displayed publicly, or was available for sale, since in some embodiments these events are tracked in the ownership history record of the UAR. In this example the user of type "artist" will transfer possession to a user of type "gallery". In this setting, the Artists maintain control of the ownership record but grants the "Gallery" access to the data. This transfer allows a gallery to extract the data contained in the UAR to automate many of the tasks a gallery performs to put on a show, using tools 467 from system 400, for example. The automation may include generating a manifest of works transferred, printing the show labels for the gallery wall, dynamically building a preshow catalog with interactive features, creating individual artwork tear sheets, building show catalogs, creating an interactive show experience, and initiating a transfer of ownership to a collector. In each of these examples the data is extracted from the UAR by the gallery-type user on the basis of the gallery-type user having possession of the artwork that is indicated in a possession record associated with the UAR.

Figure 15:
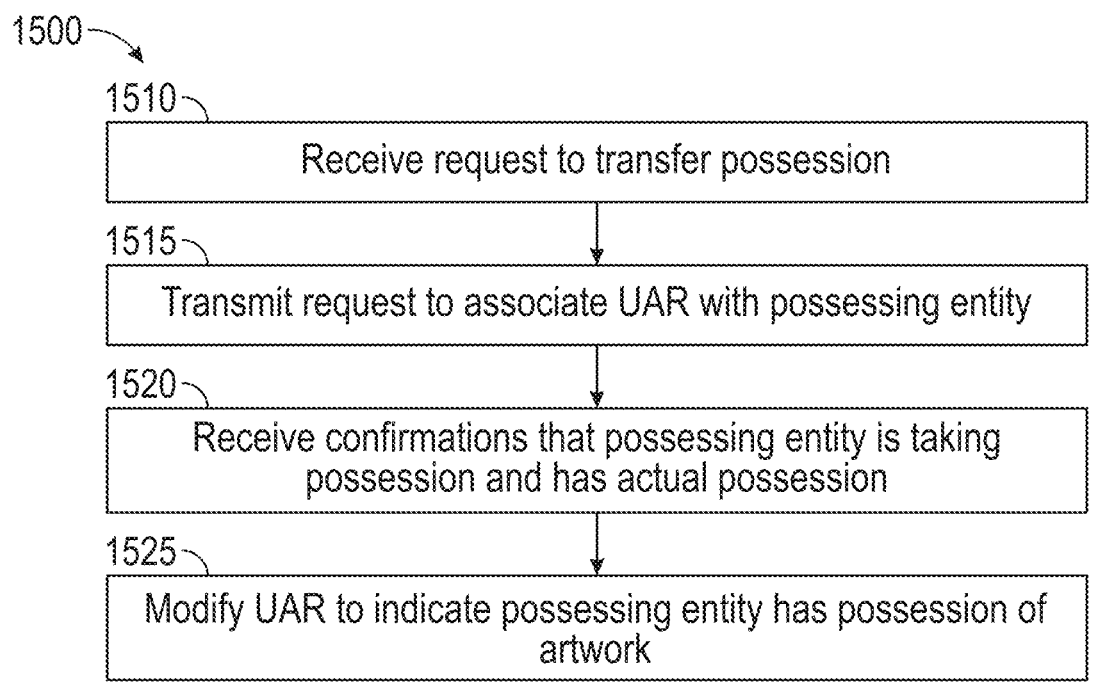
FIG. 15 shows a flow diagram of a method of transferring possession of a universal art record to a possessing entity, according to an embodiment.

FIG. 15 shows a flow diagram of a method 1500 of transferring possession of a UAR to a possessing entity, such as a gallery-type user, according to an embodiment. The server may receive, over the network connection, a request to transfer possession of the artwork from the named user at step 1510, the request including the identification of the UAR stored on the server associated with the artwork. In response to receiving the request, a request to associate the UAR with a possessing entity may be transmitted by the server at step 1515. The request to associate may be transmitted to a computing device of the possessing entity over the network connection, similarly to the request to associate the UAR with a buyer described above.

In response to the request to associate the UAR with the possessing entity, the server may receive confirmation that the possessing entity intends to take possession the artwork and confirmation that the possessing entity has actual possession of the artwork at step 1520. This may be implemented using two-factor authentication, in the same fashion as described above with respect to the transfer of ownership, for both the named user and the possessing entity. Finally, in response to receiving the permission from the named user and the confirmations from the possessing entity, the UAR may be automatically modified to indicate in a possession field that the possessing entity is now in possession of the artwork at step 1525.

If the possessing entity returns possession to the named owner at a subsequent time (e.g., after a showing, when the artwork has not been sold), the server may modify the UAR to indicate that the named user has regained possession of the artwork. This may be done, for example, in response to the server receiving a notification from the computing device of the named user, where the notification message included in the notification indicates that possession has been returned to the named user. Like the ownership transfer process, the notification message may be transmitted subsequent to a message being sent by the computing device of the possessing entity that requests transfer of the possession of the artwork from the possessing entity to the named user.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A method for maintaining and transferring digital records associated with an artwork, the method comprising:
 receiving, by a server over a network connection, a request to transfer ownership of the artwork from a selling user, the request including an identification of a universal art record stored on the server, the universal art record being associated with the artwork and being one of a plurality of universal art records stored in a database on the server, where the selling user has possession access to the universal art record;
 transmitting, by the server in response to receiving the request, a request to associate the universal art record with a second user, the request to associate being transmitted to a computing device of the second user over the network connection;
 receiving, by the server in response to the request to associate the universal art record with the second user, confirmation that the second user wishes to acquire the artwork;
 transmitting, by the server, transfer confirmation codes to each of the second user and a named user via predetermined channels associated with each of the second user and the named user, the named user being identified as a current owner of the artwork within an ownership field of the universal art record and being a different entity from the selling user, the predetermined channels being external to client applications used by each of the second user and the named user and having been previously designated by the second user and the named user as channels to be used exclusively for receipt of transfer confirmation codes;

receiving, by the server via the network connection, the transfer confirmation codes from both the named user and the second user; and modifying, in response to receiving the transfer confirmation codes, the universal art record to indicate in the ownership field that the second user is now the current owner of the artwork, the modification providing the second user with the ability to access a virtual certificate of authenticity and grant possession access to the universal art record to other users, where possession access allows viewing of a greater number of fields of the universal art record relative to users having only public access and further allows a user having possession access to become an authorized selling user.

2. The method of claim 1, the universal art record comprising an art record component and an ownership record component, the ownership field being contained in the ownership record component.

3. The method of claim 2, the virtual certificate of authenticity comprising a level of certification assigned based upon which user has transmitted a verification to the server that the universal art record corresponds to the artwork.

4. The method of claim 3, the level of certification being a first level when the user who transmitted the verification to the server is of a private user type, the level of certification being a second level, higher than the first level, when the user who transmitted the verification to the server is of a gallery user type, and the level of certification being a highest third level when the user who transmitted the verification to the server is an artist of the artwork.

5. The method of claim 3, the ownership record component further comprising image data captured from the artwork.

6. The method of claim 1, further comprising:
receiving, by a server over a network connection, a request to transfer possession of the artwork from the named user, the request including the identification of the universal art record stored on the server;
transmitting, by the server in response to receiving the request, a request to associate the universal art record with a possessing entity, the request to associate being transmitted to a computing device of the possessing entity over the network connection;
receiving, by the server in response to the request to associate the universal art record with the possessing entity, confirmation that the possessing entity intends to take possession the artwork and confirmation that the possessing entity has actual possession of the artwork; and
modifying, by the server, in response to receiving the permission from the named user and the confirmations from the possessing entity, the universal art record to indicate in a possession field that the possessing entity is now in possession of the artwork.

7. The method of claim 6, further comprising modifying, by the server, the universal art record to indicate that the named user has regained possession of the artwork in response to receiving a notification from the computing device of the named user that possession has been returned to the named user.

8. The method of claim 7, the modifying the universal art record to indicate that the named user has regained possession being subsequent to receiving, by the server, a request to transfer possession of the artwork from the possessing entity.

9. The method of claim 6, the request to transfer ownership of the artwork from the named user being received from the computing device of the possessing entity over the network connection.

10. A computer program product, comprising a non-transitory computer-readable medium having computer-readable program code embodied therein to be executed by one or more processors, the program code including instructions to:
receive, over a network connection, a request to transfer ownership of the artwork from a selling user, the request including an identification of a universal art record stored on the server, the universal art record being associated with the artwork and being one of a plurality of universal art records stored in a database on the server, where the selling user has possession access to the universal art record;
transmit, in response to receiving the request, a request to associate the universal art record with a second user, the request to associate being transmitted to a computing device of the second user over the network connection;
receive, in response to the request to associate the universal art record with the second user, confirmation that the second user wishes to acquire the artwork;
transmit transfer confirmation codes to each of the second user and a named user via predetermined channels associated with each of the second user and the named user, the named user being identified as a current owner of the artwork within an ownership field of the universal art record and being a different entity from the selling user, the predetermined channels being external to client applications used by each of the second user and the named user and having been previously designated by the second user and the named user as channels to be used exclusively for receipt of transfer confirmation codes;
receive via the network connection, the transfer confirmation codes from both the named user and the second user; and
modify, in response to receiving the transfer confirmation codes, the universal art record to indicate in the ownership field that the second user is now the current owner of the artwork, the modification providing the second user with the ability to access a virtual certificate of authenticity and grant possession access to the universal art record to other users, where possession access allows viewing of a greater number of fields of the universal art record relative to users having only public access and further allows a user having possession access to become an authorized selling user.

11. The computer program product of claim 10, the universal art record comprising an art record component and an ownership record component, the ownership field being contained in the ownership record component.

12. The computer program product of claim 11, the virtual certificate of authenticity comprising a level of certification assigned based upon which user has transmitted a verification to the server that the universal art record corresponds to the artwork.

13. The computer program product of claim 12, the level of certification being a first level when the user who transmitted the verification to the server is of a private user type, the level of certification being a second level, higher than the first level, when the user who transmitted the verification to the server is of a gallery user type, and the level of certification being a highest third level when the user who transmitted the verification to the server is an artist of the artwork.

14. The computer program product of claim 12, the ownership record component further comprising image data captured from the artwork.

15. The computer program product of claim 10, the program code comprising further instructions to:
receive a request to transfer possession of the artwork from the named user, the request including the identification of the universal art record stored on the server;
transmit, in response to receiving the request, a request to associate the universal art record with a possessing entity, the request to associate being transmitted to a computing device of the possessing entity over the network connection;
receive, in response to the request to associate the universal art record with the possessing entity, confirmation that the possessing entity intends to take possession the artwork and confirmation that the possessing entity has actual possession of the artwork; and
modify, in response to receiving the permission from the named user and the confirmations from the possessing entity, the universal art record to indicate in a possession field that the possessing entity is now in possession of the artwork.

16. The computer program product of claim 15, the program code comprising further instructions to modify the universal art record to indicate that the named user has regained possession of the artwork in response to receiving a notification from the computing device of the named user that possession has been returned to the named user.

17. A system comprising:
one or more processors; and
a non-transitory computer-readable medium storing a plurality of instructions, which when executed, cause the one or more processors to:
receive, over a network connection, a request to transfer ownership of the artwork from a selling user, the request including an identification of a universal art record stored on the server, the universal art record being associated with the artwork and being one of a plurality of universal art records stored in a database on the server, where the selling user has possession access to the universal art record;
transmit, in response to receiving the request, a request to associate the universal art record with a second user, the request to associate being transmitted to a computing device of the second user over the network connection;
receive, in response to the request to associate the universal art record with the second user, confirmation that the second user wishes to acquire the artwork;
transmit transfer confirmation codes to each of the second user and a named user via predetermined channels associated with each of the second user and the named user, the named user being identified as a current owner of the artwork within an ownership field of the universal art record and being a different entity from the selling user, the predetermined channels being external to client applications used by each of the second user and the named user and having been previously designated by the second user and the named user as channels to be used exclusively for receipt of transfer confirmation codes;
receive via the network connection, the transfer confirmation codes from both the named user and the second user; and
modify, in response to receiving the transfer confirmation codes, the universal art record to indicate in the ownership field that the second user is now the current owner of the artwork, the modification providing the second user with the ability to access a virtual certificate of authenticity and grant possession access to the universal art record to other users, where possession access allows viewing of a greater number of fields of the universal art record relative to users having only public access and further allows a user having possession access to become an authorized selling user.

18. The system of claim 17, the universal art record comprising an art record component and an ownership record component, the ownership field being contained in the ownership record component.

19. The system of claim 18, the virtual certificate of authenticity comprising a level of certification assigned based upon which user has transmitted a verification to the server that the universal art record corresponds to the artwork.

* * * * *